US008724908B2

(12) United States Patent
Dale et al.

(10) Patent No.: US 8,724,908 B2
(45) Date of Patent: *May 13, 2014

(54) SYSTEM AND METHOD FOR LABELING A COLLECTION OF IMAGES

(75) Inventors: Kevin T. Dale, Cambridge, MA (US); Lubomir D. Bourdev, San Jose, CA (US); Shmuel Avidan, Brookline, MA (US); Alexandre S. Parenteau, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 248 days.

This patent is subject to a terminal disclaimer.

(21) Appl. No.: 12/956,467

(22) Filed: Nov. 30, 2010

(65) Prior Publication Data

US 2013/0129231 A1  May 23, 2013

Related U.S. Application Data

(60) Provisional application No. 61/380,041, filed on Sep. 3, 2010.

(51) Int. Cl.
*G06K 9/62* (2006.01)

(52) U.S. Cl.
USPC ..................................... 382/224

(58) Field of Classification Search
USPC ..................................... 382/224
See application file for complete search history.

(56) References Cited

U.S. PATENT DOCUMENTS

| 7,403,642 | B2 | 7/2008 | Zhang et al. |
| 7,564,994 | B1 * | 7/2009 | Steinberg et al. ............ 382/118 |
| 7,764,849 | B2 * | 7/2010 | Aguera y Arcas et al. ... 382/305 |
| 7,822,233 | B2 * | 10/2010 | Nagaoka et al. .............. 382/118 |
| 7,983,489 | B2 * | 7/2011 | Aguera y Arcas et al. ... 382/220 |
| 8,259,995 | B1 * | 9/2012 | Schendel et al. ............. 382/103 |
| 8,422,747 | B1 * | 4/2013 | Leung et al. .................. 382/118 |
| 2011/0043437 | A1 * | 2/2011 | Tang et al. ...................... 345/55 |

OTHER PUBLICATIONS (Zak Stone, "Autotagging Facebook: Social Network Context Improves Photo Annotation", 2008, IEEE).*
(Jingyu Cui, "Easy Album: An Interactive Photo Annotation System Based on Face Clustering and Re-ranking", 2007, CHI 2007 Proceedings).*
D. Anguelov, K.C. Lee, S.B. Gokturk, and B. Sumengen. Contextual identity recognition in personal photo albums. CVPR 1007, 7 pages, 2007.

* cited by examiner

*Primary Examiner* — Samir Ahmed
*Assistant Examiner* — Totam Le
(74) *Attorney, Agent, or Firm* — Wolfe-SBMC

(57) ABSTRACT

Various embodiments of a system and methods for labeling images are described. An image labeling system may receive multiple images. A subset of the images may be labeled to identify image content or elements, such as faces. The system may display some of the labeled image elements in different portions of a display area. Unlabeled image elements may be displayed in the same display area. The display size and position of each unlabeled image element may be dependent on similarities between the unlabeled image element and the displayed, labeled image elements. The system may receive input which indicates that one or more of the displayed, unlabeled image elements should receive the same label as one of the displayed, labeled image elements. Similarities between image elements may be re-analyzed, dependent on the assigned labels, and the display of unlabeled images may be updated.

20 Claims, 14 Drawing Sheets

SYSTEM AND METHOD FOR LABELING A COLLECTION OF IMAGES

PRIORITY INFORMATION

This application claims benefit of priority of U.S. Provisional Application Ser. No. 61/380,041 entitled "System and Method for Labeling a Collection of Images" filed Sep. 3, 2010, the content of which is incorporated by reference herein in its entirety.

BACKGROUND

An advantage of digital photography over film is the ability to capture a multitude of images with little or no added expense. As a result, it is common for photographers to accumulate large digital image collections that can be difficult to maintain and difficult to browse serially. Unlike conventional film-based photographs, digital photographs can be loaded onto a computer system. Photographs can then be accessed, organized and manipulated using photograph management software. In managing a collection of digital photographs, it is quite useful to assign labels, or tags, to the photographs, to facilitate subsequent operations involving the photographs. For example, photographs can be labeled with the names of the people that appear in the photographs to facilitate subsequent retrieval of photographs containing a specific person.

It can be very time-consuming to label all of the images in a large collection of digital images, especially when a user must manually label each image. As a semi-automatic process for labeling faces in images, conventional face labeling systems use traditional face recognition techniques to detect and match faces in a set of images. Based on the face recognition results, a conventional face labeling system provides suggested labels for specific faces to a user. For example, the conventional face labeling system displays a number of faces that are similar to a labeled face and instructs the user to confirm whether the label applies to all of the displayed faces.

Such conventional methods do not utilize the full knowledge of the face recognition engine, as this method of suggesting specific labels requires a strict threshold to determine whether unlabeled faces are presented to a user with a suggested label. For example, the conventional face labeling system may be somewhat confident in a face match, but not confident enough to display the faces as a suggested match. The conventional face labeling system must adhere to the strict threshold, and, thus, has no means to indicate partial confidence in a face match. Accordingly, a conventional face labeling system is typically either too conservative or too liberal in providing face label suggestions. With a conservative setting, a conventional face labeling system will only suggest labels and faces which are highly likely to be a match. This approach results in a lot of work for the user, as the system will not display many suggested faces and the user will need to manually label many faces. With a liberal setting, a conventional face labeling system will display labels and faces that have a low likelihood of being a match. This approach will result in frustration for the user, as the user will be required to correct many mistakes made by the conventional face labeling system. Furthermore, conventional systems require context-switching, as multiple different user interface windows are required as users provide label inputs for different groups of suggested faces.

SUMMARY

An image labeling system may provide a method for labeling a collection of images. For example, the image labeling system may provide a mechanism for a user to label all of the faces that appear in a collection of digital images. The image labeling system may locate a plurality of image elements in a collection of digital images. For example, the image labeling system may detect all of the faces that appear in the collection of digital images. The plurality of image elements may include a subset of image elements that have been labeled by a user. The image labeling system may display one or more of the labeled image elements in a display area. Each one of the one or more labeled image elements may have a different label and may be displayed in a different region of the display area. For example, the image labeling system may display one or more labeled faces, each in a different region in the display area.

The image labeling system may display, in the same display area, one or more unlabeled image elements from the plurality of image elements. The display position of each one of the one or more unlabeled image elements may be dependent on similarities between the respective unlabeled image element and at least one of the one or more unlabeled image elements. For example, the image labeling system may display one or more unlabeled faces in the display area. The display position of an unlabeled face may be dependent on similarities between the unlabeled face and at least one of the labeled faces. The image labeling system may receive input which indicates a request to assign a label for one of the labeled images to at least one of the displayed unlabeled images. For example, a user may indicate that a label for one of the labeled faces in the display area should be applied to one or more of the unlabeled faces in the display area.

Figure 1:
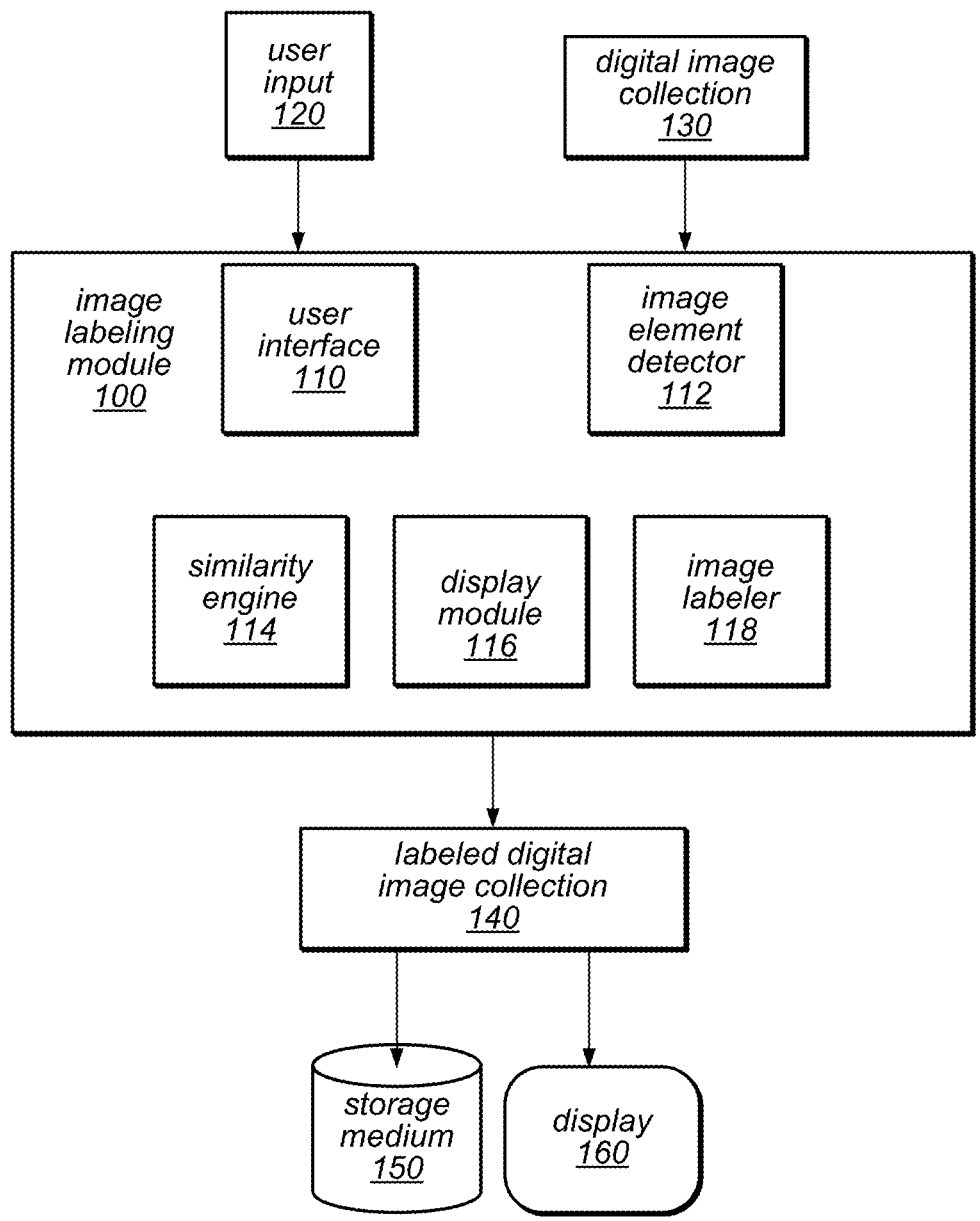
FIG. 1 illustrates an example of an image labeling module which may be used to label image elements in a collection of images, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (e.g., meaning having the potential to), rather than the mandatory sense (e.g., meaning must). Similarly, the words "include", "including", and "includes" mean including, but not limited to.

DETAILED DESCRIPTION OF EMBODIMENTS

Various embodiments of a system and methods for labeling a collection of images are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description may be presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of a system and methods for labeling a collection of images are described herein. For simplicity, embodiments of the system and methods for labeling a collection of images described herein will be referred to collectively as an image labeling system. For example purposes, embodiments of the image labeling system will be described herein as a system for labeling faces in digital images. Note that the example of labeling faces in digital images is not meant to be limiting, as other embodiments of the image labeling system may assign labels to images based on image content other than faces.

Some embodiments of the image labeling system, as described herein, may provide a semi-automated mechanism by which a user may assign labels to all of the images in a collection of digital images. For example, the image labeling system may enable the user to label all of the image elements (e.g., faces) that appear in each image of the digital image collection. A label, or a "tag," that is assigned to a face may be a person's name or may otherwise identify the person. Labels that are assigned to faces in a digital image may be associated with the image. For example, the face labels may be included in metadata for the image. A digital image may include several faces, each of which may have a different label. Accordingly, each face label may include information which identifies a particular face in the image that corresponds to the face label. For example, the face label may include coordinate information which may specify the location of the corresponding face in the digital image. Other labels that may be assigned to images via the image labeling system may identify content other than faces that is contained within the images. For example, the image labels may identify a particular event, location or scene that is contained in the content of the image.

A user may apply labels to images in a digital image collection for a variety of reasons. For example, the image labels may enable efficient search and retrieval of images with particular content from a large image collection. As another example, image labels may enable efficient and accurate sorting of the images by image content. Examples of digital images that may be included in a digital image collection may include, but are not limited to, images captured by a digital camera, photographs scanned into a computer system, and video frames extracted from a digital video sequence. A collection of digital images may be a set of digital photographs organized as a digital photo album, a set of video frames which represent a digital video sequence, or any set of digital images which are organized or grouped together. Digital images may also be visual representations of other types of electronic items. For example, the digital images may be visual representations of electronic documents, such as word processing documents, spreadsheets, and/or portable document format (PDF) files. The image labeling system may be operable to enable a user to label a collection of any sort of electronic items which may be visually represented.

The image labeling system may provide a semi-automatic mechanism by which a user may efficiently assign labels to all of the images in a set of images. The system, via a display in a display area, may automatically display unlabeled image elements that are likely to be similar to displayed, labeled image elements. The image labeling system may indicate a likelihood of similarity between an unlabeled image element and a labeled image element via the spatial proximity of the unlabeled image element to the labeled image element. For example, an unlabeled image element that is more likely to be similar to a labeled image element may be displayed closer, in spatial proximity, to the labeled image element. A user may provide a manual input which may indicate labels for the unlabeled image elements.

The image labeling system may maintain the same context (e.g., a same view in a same display area) as image elements are labeled. The display of unlabeled image elements in the display area may be continuously updated as image elements are labeled by a user, but the context of the display area may not be changed throughout the image element labeling process. Accordingly, the user does not have to lose context or navigate through multiple windows, as in conventional methods, while labeling a set of images.

The image labeling system may analyze image content to determine image elements that are likely to be similar. The system may occasionally make mistakes when determining similar image elements, due to obscured content, poor quality images, etc. However, any mistakes that may be made by the image labeling system may be unobtrusive to the user. For example, a user may simply ignore unlabeled image elements in a display area that do not match any of the labeled image elements in the display area. The non-matched unlabeled image elements may eventually be removed from the display area as the image labeling system continuously updates the display of unlabeled image elements in response to labels that are received from the user. Because the mistakes of the system are unobtrusive to the user, the image labeling system may not be restricted by the strict constraints of conventional systems which determine whether an unlabeled image element should be displayed with a particular suggested label.

The user input which indicates labels for unlabeled faces may serve two purposes for the image labeling system. The user input may enable the image labeling system to assign labels to unlabeled faces, in order to meet the goal of the system to label all of the images in a set of images. Furthermore, the user input may serve as training information which may assist the image labeling system in making more accurate estimations of similar image elements. The image labeling system may use the user-assigned labels as additional criteria when comparing image elements to determine whether the image elements are similar. The image labeling system may continuously receive training feedback as a user indicates labels and may use the training feedback to increase the accuracy of determining similar image elements. Accordingly, the accuracy of the display of the unlabeled image elements may be increasingly improved as the image element labeling process progresses, which may, in turn, increase efficiencies for the user of the system.

Image Labeling Module

Figure 14:
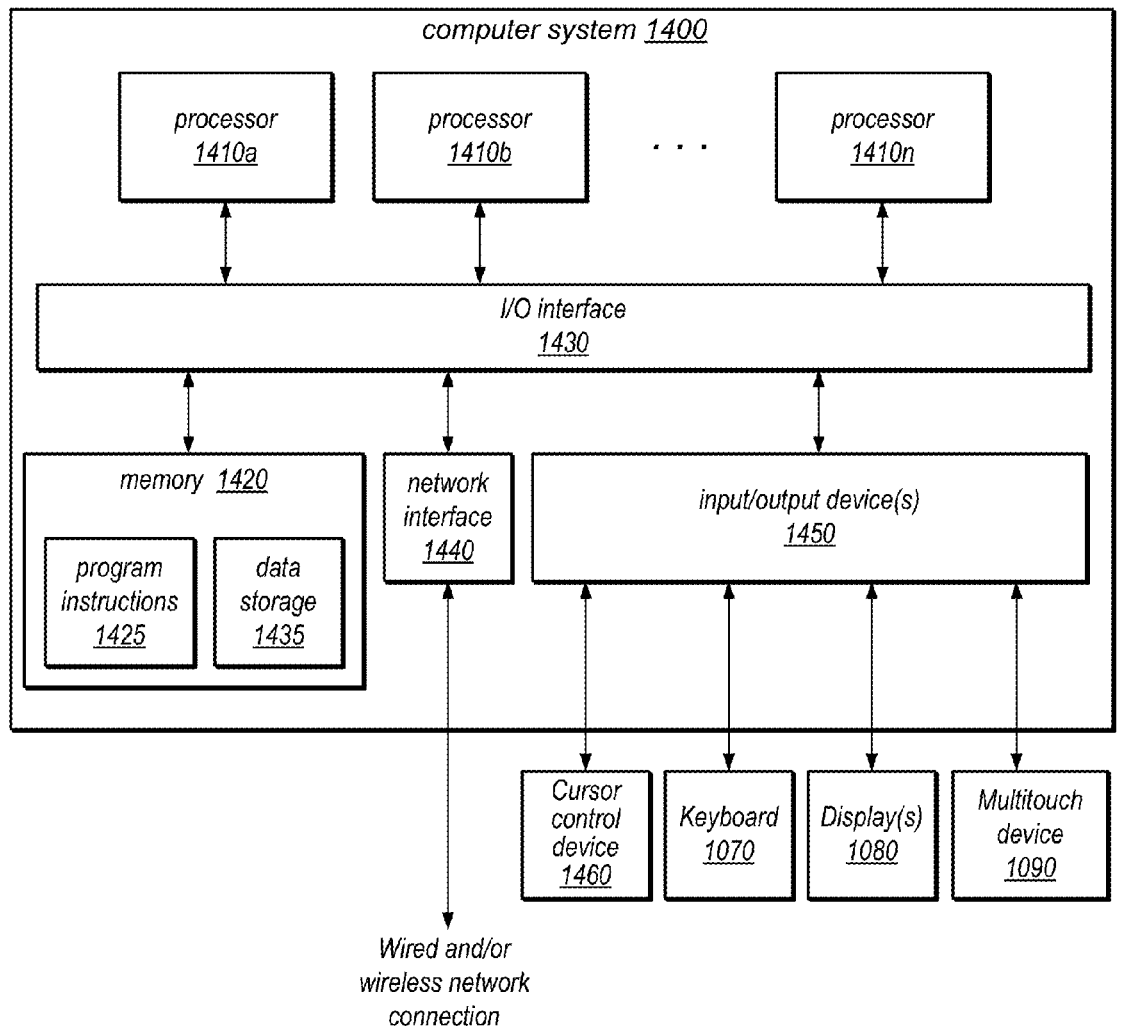
FIG. 14 illustrates an example computer system that may be used in embodiments.

In some embodiments, the image labeling system may analyze a collection of digital images to detect all image elements that appear in each image of the collection and may provide a mechanism for a user to assign labels to each one of the detected image elements. Embodiments of the method for labeling detected image elements in a collection of digital images may be implemented, for example, in an image labeling module. As an example the image elements that may be detected in a collection of digital images and labeled by the image labeling system may be a set of faces. An example image labeling module is illustrated in FIG. 1. An example system on which embodiments of an image labeling module may be implemented and executed is illustrated in FIG. 14, described in further detail below. Image labeling module 100 (or, simply, module 100) may be implemented as or in a stand-alone application or as a module of or plug-in for an image processing and/or image management application, e.g., for managing a digital photograph collection or archive. Examples of types of applications in which embodiments of module 100 may be implemented may include, but are not limited to, image analysis and editing, processing, and/or presentation applications, as well as applications in security or defense, educational, scientific, medical, publishing, digital photography, digital films, games, animation, marketing, and/or other applications in which digital image analysis, editing or presentation may be performed. Specific examples of applications in which embodiments may be implemented include, but are not limited to, Adobe® Photoshop®, Adobe® Photoshop Elements®, Adobe® Premier Elements® and Adobe® Lightroom®. Image labeling module 100 may also be used to display, manipulate, modify, classify, and/or store images, for example to a memory medium such as a storage device or storage medium.

Image labeling module 100 may receive as input a collection of digital images, such as digital image collection 130 illustrated in FIG. 1. Digital image collection 130 may be a collection of digital images (e.g. photographs) grouped, for example, as a digital photo album. Examples of digital images may include, but are not limited to Joint Photographic Experts Group (JPEG) files, Graphics Interchange Format (GIF) files, Tagged Image File Format (TIFF) files, or Portable Network Graphics (PNG) files. In other embodiments, digital image collection 130 may be a collection of visual representations of other types of electronic files, such as word processing documents, spreadsheets, and/or PDF documents. In some embodiments, the images of digital image collection 130 may include various image elements which a user may wish to identify by assigning a label to each image element. The image elements may be various types of image content. For example, the image elements may be faces of people that appear in the digital images. As another example, the image elements may be image content such as a particular event, location and/or scene.

Image element detector 112 of module 100 may analyze digital image collection 130 to detect all of the image elements that appear in the images of digital image collection 130. As an example, image element detector 112 may be a face detector. The face detector may, in various embodiments, use various algorithms to detect the faces which appear in digital image collection 130. Such algorithms may include, for example, facial pattern recognition as implemented in algorithms such as Eigenfaces, Adaboost classifier training algorithms, and neural network-based face detection algorithms. In other embodiments, the image labeling system may be operable to detect image content other than, or in addition to, faces. For example, the image labeling system may be operable to detect content such as a particular scene or location in a collection of digital images.

Similarity engine 114 of module 100 may analyze the set of image elements detected by image element detector 112 to locate image elements that are likely to be the same image content. As an example, similarity engine 114 may be a face recognition engine that may analyze a set of faces detected in digital image collection 130. The face recognition engine may determine faces that are likely to belong to the same person. The face recognition engine may compare the facial characteristics for each pair of faces in the set of detected faces.

In addition to facial characteristics, the face recognition engine may compare visual and non-visual, contextual characteristics that are associated with faces in the set of detected faces. Examples of such visual and non-visual, contextual characteristics may be clothing features, hair features, image labels, and/or image time stamps. A label that is assigned to a face may indicate particular traits that may be useful in determining whether two faces belong to the same person. For example, a label that is assigned to a face may indicate a gender, race and/or age of the person represented by the face. Dependent on the facial characteristics and/or the contextual characteristics, the face recognition engine may compute a similarity metric for each pair of faces. The similarity metric may be a value which indicates a probability that the pair of faces belong to the same person. Similarity engine 114 may be configured to analyze other types of detected image elements (e.g., landscapes) to determine similar characteristics between the detected image elements. Dependent on the analysis, similarity engine 114 may calculate a similarity metric for each pair of detected image elements.

Dependent on the similarity metrics calculated by similarity engine 114, image labeling module 100 may display a subset of the image elements to a user. For example, display module 116 may select, dependent on the similarity metrics calculated by similarity engine 114, a subset of the detected image elements to display for a user. The image elements may be displayed, for example, in user interface 110. Display module 116 may display, in user interface 110, for example, a combination of image elements which have labels (e.g., labeled image elements) and faces which do not have labels (e.g., unlabeled image elements).

Display module 116 may determine a display location, within user interface 110, for each unlabeled image element dependent on similarity metrics between the displayed, unlabeled image elements and the displayed, labeled image elements. For example, as described in further detail below, the spatial proximity of each displayed, unlabeled image element to a displayed, labeled image element may indicate the probability that the two image elements contain the same content. As an example, image labeling module 100 may display labeled and unlabeled faces in user interface 110. The spatial proximity of the unlabeled faces to the labeled faces in the display area of user interface 110 may indicate the probability that the unlabeled and labeled faces belong to the same person.

User interface 110 may provide a mechanism by which a user may indicate image elements which contain the same content. User interface 110 may provide one or more textual and/or graphical user interface elements, modes or techniques via which a user may interact with module 100, for example to specify, select, or change the value for one or more labels identifying one or more image elements in digital image collection 130. For example, using a selection mechanism provided by user interface 110, a user, via user input 120, may indicate unlabeled faces that belong to the same person as a labeled face.

The image labeling system may be used with any type of computing input device via which a user may select displayed image elements and assign and/or change labels for displayed image elements. For example, the image labeling system may include a conventional input pointing device, such as a mouse. As another example, the image labeling system may include a stylus input applied to a tablet PC. As yet another example, the image labeling system may include a touch-sensitive device configured to interpret touch gestures that are applied to the surface of the touch-sensitive device. As an alternative, the image labeling system may include an input device that is configured to sense gestural motions in two-dimensional or three-dimensional space. An example of such an input device may be a surface that is configured to sense non-contact gestures that are performed while hovering over the surface, rather than directly contacting the surface. User interface 110 may provide various selection tools, for example, a rectangular selection box, a brush tool, and/or a lasso tool, via which a user may use any of the input mechanisms described above to select one or more images displayed in user interface 110.

Dependent on the user input, image labeling module 100 may assign labels to the unlabeled image elements selected, or indicated, by the user via user input 120. For example, image labeler 118 may assign labels to unlabeled image elements, dependent on the user input. As an example, image labeler 118 may assign labels to unlabeled faces, dependent on the user input. In some embodiments, the labels may be tags assigned to the images in which the labeled image elements are depicted. The labels may be stored in association with the images, for example, as part of the image metadata. Module 100 may generate as output a labeled digital image collection 140, with each face, or other image content, in the collection associated with a label. Labeled digital image collection 140 may, for example, be stored to a storage medium 150, such as system memory, a disk drive, DVD, CD, etc., and/or displayed on a display 160.

Labeling Image Elements

The images of digital image collection 130 may include various image elements which a user may wish to identify with labels. For example, digital image collection 130 may include images of various people which a user may wish to identify by assigning a label to each person. Labeling each person that appears in digital image collection 130 may allow a user to perform future searches to locate a particular person or persons within the digital image collection. For example, a user may wish to perform a search of the digital image collection in order to locate all images which contain a person labeled as "Ellen." Since facial characteristics may be a convenient mechanism for recognizing a person in an image, people in digital images may be identified by their faces. Similarly, a label which identifies a person in a digital image may be associated with the person's face in the image. Accordingly, the labels referred to herein may be labels associated with faces in a collection of digital images. A label associated with a face in a digital image may typically be the name of the person in the digital image, although other types of labels are possible. For example, a label may be a description that identifies a person as part of a particular group (e.g., "family" or "classmate").

As described above, image labeling module 100 may receive a digital image collection 130. Image element detector 112 may perform an analysis of the images in digital image collection 130 to detect all of the faces that appear in digital image collection 130. To detect faces that appear in a digital image, image element detector 112 may identify regions or portions of the digital image that may correspond to a face depicted in the digital image. In various embodiments, various techniques may be used by image element detector 112 to identify such regions or portions of a digital image that may correspond to a face. Some example techniques that may be employed by image element detector 112 may include, but are not limited to, facial patterns defined by Eigenfaces, Adaboost classifier training algorithms, and neural network-based face detection algorithms.

Figure 2:
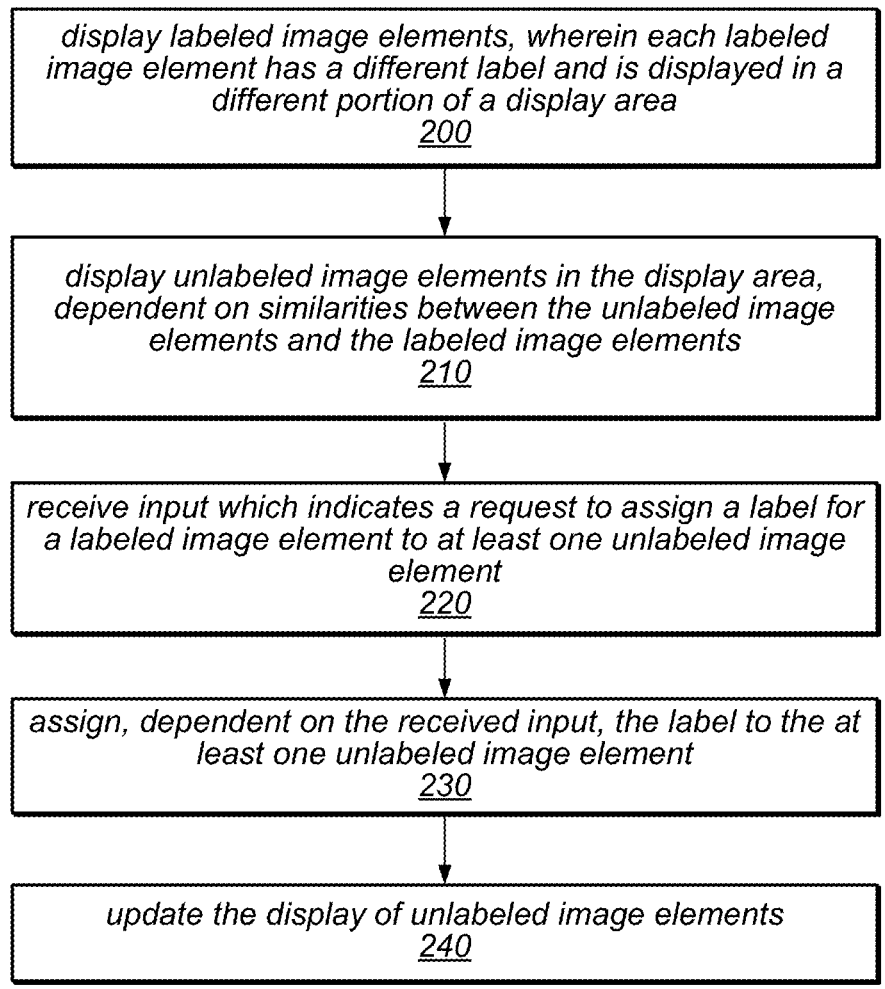
FIG. 2 is a flowchart of a method for labeling image elements in a collection of images, according to some embodiments.

Image labeling module 100 may implement the method illustrated in FIG. 2 to label each image element (e.g., each face) that is detected in digital image collection 130. As indicated at 200, the method illustrated in FIG. 2 may include displaying labeled image elements, wherein each labeled image element has a different label and is displayed in a different portion of a display area. For example, face display module 116 may display, in user interface 110, image elements which are a subset of the faces detected in digital image collection 130. Each face in the subset of faces that is displayed in user interface 110 may have a label that has been assigned by a user. Each of the displayed faces may have a different label (e.g., may be a different person) and may be displayed in a different portion of the display area in user interface 110.

The labeled faces that are displayed by face display module 116 may be a subset of the detected faces in digital image collection 130. A user, via user interface 110 of module 100, may assign labels to the subset of the faces in digital image collection 130. The initial user input which assigns labels to a subset of faces in the digital image collection may provide an initial set of labeled faces which the image labeling system may use to begin the image labeling process. In some embodiments, the user may select a desired number of the detected faces and may provide user input which may assign a label to each face selected by the user. In other embodiments, image labeling module 100 may provide guidance, and/or instructions, to the user for labeling a subset of the detected faces. For example, image labeling module 100, via user interface 110, may instruct the user to select and label a certain number of the detected faces in digital image collection 130. In such an example, image labeling module 100 may request that the user assign labels to a particular number, or a particular percentage, of the detected faces in digital image collection 130.

In other embodiments, image labeling module 100 may select a subset of the faces detected in digital image collection 130 and may request that the user assign a label to each face in the selected subset of faces. Similarity engine 114 may calculate a similarity metric for each pair of detected faces in digital image collection 130. The similarity metric for a pair of faces may correspond to a measure of similarity between the faces. In some embodiments, image labeling module 100 may select the initial subset of faces to be labeled by a user dependent on the similarity metrics calculated by similarity engine 114. For example, dependent on the similarity metrics, similarity engine 114 may form groups of similar faces. From each group of similar faces, similarity engine 114 may select a representative image. Image labeling module 100 may display some, or all, of the representative faces to the user and may request that the user assign a label to each one of the representative faces. Some or all of the faces which have been labeled by a user may be displayed by image labeling module 100 in user interface 110.

Figure 3:
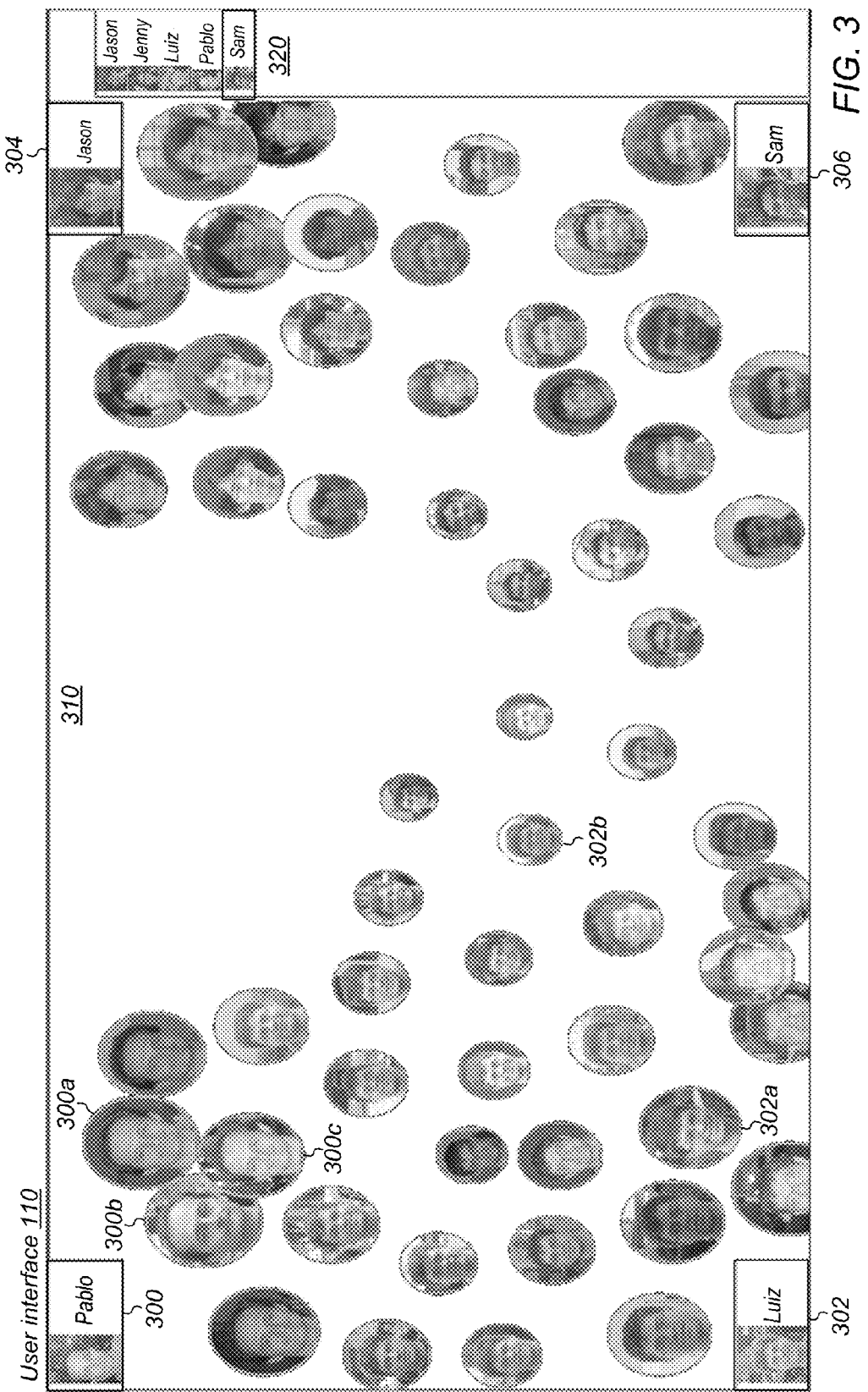
FIG. 3 illustrates an example of a user interface which may include a display of labeled image elements and unlabeled image elements, according to some embodiments.

An example of labeled faces that may be displayed in user interface 110 is illustrated in FIG. 3. As shown in FIG. 3, multiple labeled faces may be displayed in different portions of the user interface. For example, region 310 of FIG. 3 illustrates four faces, 300, 302, 304 and 306, which have different labels. In FIG. 3, each one of the labeled faces, 300-306, is displayed in a different corner of the rectangular display region 310 of user interface 110. Note that FIG. 3 merely illustrates an example of one type of user interface which may be used in some embodiments to display labeled image elements (e.g., faces) in different regions of a display area.

Other embodiments may display a different number of labeled image elements, may use different portions of a display region, and/or may use a display region of a different shape. For example, instead of displaying four different labeled faces in the four corners of a rectangular display area, as illustrated in region 310 of FIG. 3, other embodiments may display a number of different labeled faces in different regions of a circular display area. In yet another example, a user, via user input 120, may determine how many labeled faces to display, and may determine where to display each labeled face in the display area. Various options may exist for displaying a number of labeled image elements in a display area. The labeled image elements may be displayed in any configuration such that a suitable amount of visual separation exists between the different labeled image elements. As described in further detail below, the displayed, labeled image elements may serve as a baseline set of image elements that may be used by a user to indicate labels for unlabeled image elements.

In some embodiments, image labeling module 100 may automatically select the labeled faces that are displayed in a display region. As an example, image labeling module 100 may arbitrarily select four faces from the subset of labeled faces for display in region 310. As another example, image labeling module 100 may display a number of representative images from groups of similar images that have been formed dependent on the similarity metrics, as described above. In other embodiments, a user may select the labeled faces which may be displayed in region 310 of user interface 110. As an example, FIG. 3 illustrates, in column 320, a set of faces that have been labeled by the user. The set of faces displayed in column 320 may be all of the faces that have been labeled by the user or may be a subset of the faces that have been labeled by the user. The user may select, from the faces displayed in column 320, one or more faces to be displayed in region 310. For example, the user may select a face in column 320 may drag the face into region 310.

The image labeling system, in various embodiments, may use a variety of different methods to detect image elements in digital images. The image labeling system, in various embodiments, may also use a variety of different methods to determine similarities between image elements and calculate similarity metrics for pairs of image elements. As an example, image element detector 112 and similarity engine 114 may detect faces and calculate similarity metrics for pairs of the detected faces using a method similar that described in U.S. patent application Ser. No. 12/857,351 entitled "System and Method for Using Contextual Features to Improve Face Recognition in Digital Images," filed Aug. 16, 2010, the content of which is incorporated by reference herein in its entirety.

As indicated at 210, the method illustrated in FIG. 2 may include displaying unlabeled image elements in the display area, dependent on similarities between the unlabeled image elements and the labeled image elements. As an example, display module 116 may display a number of unlabeled faces in region 310 of user interface 110. FIG. 3 illustrates an example of one or more unlabeled faces that are displayed in region 310 of user interface 110. The faces displayed as sphere-shaped thumbnails in display region 310 of FIG. 3 are examples of displayed, unlabeled faces. The display position of each unlabeled face within region 310 may be dependent on the similarity of the unlabeled face to the displayed, labeled faces.

Face display module 116 may display up to a maximum number of unlabeled faces, M, in display region 310. The maximum number of faces, M, may be determined such that the display area is not cluttered with too many unlabeled faces. For example, display module 116 may calculate M, based on the size of display region 310, such that a certain amount of open space remains in display region 310 when M unlabeled faces are displayed in display region 310. In other embodiments, a number of maximum faces, M, may be selected by a user, for example, via an options or preferences menu within user interface 110.

Face display module 116 may select up to M unlabeled faces from the set of unlabeled faces for display in display region 310. The selection of up to M unlabeled face may be dependent on the displayed, labeled faces and may also be dependent on the similarity metrics calculated by similarity engine 114. Face display module 116 may use the similarity metrics to determine the M unlabeled faces that are most similar to the displayed, labeled faces. For example, in reference to FIG. 3, face display module 116 may determine, dependent on the similarity metrics, the M unlabeled faces that are most similar to faces 300-306. As illustrated in FIG. 3, face display module 116 may display the M unlabeled faces that are most similar to the labeled faces in display region 310.

The display position of an unlabeled face may be dependent on the similarities (e.g., the similarity metrics) between the unlabeled face and the displayed, labeled faces. More specifically, as described in further detail below, the spatial proximity of an unlabeled face in display region 310 to a labeled face in display region 310 may indicate the likelihood that the two faces belong to the same person. For example, an unlabeled face and a labeled face that are displayed in close spatial proximity are very likely to be faces that belong to the same person. FIG. 3 illustrates an example of a display of unlabeled faces which indicates, via spatial proximity, faces that are likely to belong to the same person. For example, unlabeled faces 300a, 300b and 300c in FIG. 3 are displayed in close spatial proximity to labeled face 300 because the image labeling system has determined that the faces are likely to belong to the same person.

In some embodiments, the display size of an unlabeled face may also be dependent on the similarities (e.g., the similarity metrics) between the unlabeled face and the displayed, labeled faces. For example, the display size of an unlabeled face may indicate that likelihood that the unlabeled face belongs to the same person as a labeled face. For example, an unlabeled face that is more likely to be the same person as a labeled face may be displayed in a larger size than an unlabeled face that is less likely to be the same person as a labeled face. FIG. 3 illustrates an example of unlabeled faces with different display sizes. For example, note that unlabeled face 302a in FIG. 3 has a larger display size than unlabeled face 302b in FIG. 3. The image labeling system has determined that unlabeled face 302b is less likely than unlabeled face 302a to be the same person as labeled face 302. Accordingly, unlabeled face 302b is displayed with a smaller size than unlabeled face 302a in FIG. 3.

In other embodiments, the image labeling system may use other criteria to select and display unlabeled images in the display area. As an example, the image labeling system may place male faces on one side of the display area and female faces on the other side of the display area. As another example, the image labeling system may place faces in the display area based on criteria such as race and age. In yet another example, the image labeling system may place faces in the display area based on time and/or location (e.g., geo-tag) information for the images which depict the faces. The criteria for placing unlabeled images in a display area may be determined by the user via user interface 110. For example, the user may wish to label all of the faces of people who attended a particular party or event. The image labeling system may use a image labeling method similar to that described above for a particular set of images which have timestamps within a specified time period, for example, a range of time over which the particular party or event took place.

As indicated at 220, the method illustrated in FIG. 2 may include receiving input which indicates a request to assign a label for a labeled image element to at least one of the unlabeled image elements. For example, a user may provide input which selects one of the labeled image elements in a display region. The user may then provide input which selects one or more of the unlabeled image elements in the display region. The user's selection of the one or more unlabeled image elements may indicate that the label for the selected, labeled image element may be applied to the selected one or more unlabeled image elements. A user may select the one or more unlabeled image elements via a variety of different user input mechanisms provided by user interface 110. For example, the user may drag a rectangular selection region over one or more unlabeled image elements to select the unlabeled image elements. As another example, the user may use a brush tool, a lasso tool, or other similar tool to indicate selected unlabeled image elements. As described above, the user selection may be via an input pointing device, such as a mouse, or may be via a gesture applied to, or close to, a touch-sensitive screen. In some embodiments, a user is not required to select one or more of the labeled images prior to selecting unlabeled images to be associated with the labeled image. A user may select one or more unlabeled images and subsequently indicate/select a labeled image with which the unlabeled images/faces are to be associated. For example, a user may simply select one or more unlabeled images and drag the unlabeled image into a region proximate to one or more labeled images to associate the unlabeled images with the labeled image. The unlabeled images may be associated with one or more labeled images upon commitment of the unlabeled images to a region (e.g., mouse-up at the end of a user drag-and-drop operation) and/or the unlabeled images may be associated with one more labeled images nearest to the location where the one or more unlabeled images are dragged to. For example, after selecting one or more unlabeled images (e.g., via a rectangle, brush or lasso selection tool), a user may simply drag the unlabeled images into a display region (e.g., destination position) closer (e.g., nearer in spatial proximity) to a first labeled image than to another labeled image, the destination position may be determined upon mouse-up of the drag-and-drop operation, it may be determined that the unlabeled images are nearest the first labeled image based on the destination position, and the unlabeled images may be commonly labeled with (or otherwise associated with) the first labeled image. Although several embodiments described herein refer to a selection of one or more labeled images/faces prior to selection of one or more unlabeled images/faces to be associated with the labeled image/face, it will be appreciated that alternative embodiments to those described may employ the above described technique in which a user is able to select one or more unlabeled images/faces and subsequently indicate/select one or more labeled images/faces with which the unlabeled images/faces are to be associated. In some embodiments, the user may have the option on use either of these and other selection techniques. The user interface by which a user may select labeled and/or unlabeled images may be implemented in a variety of different ways and the examples provided herein are not meant to be limiting.

As a specific example, a user may select a labeled face in display region. Subsequent to the selection of the labeled face, the user may further select one or more unlabeled faces in the display region. The user selection of the one or more unlabeled faces may indicate that the label for the selected face should be applied to the selected one or more unlabeled faces. In some embodiments, a user may select a labeled face in a corner and may select one or more unlabeled faces which should receive the same label by "painting over" the unlabeled faces. The image labeling system may provide various mechanisms and/or tools via which a user may select a group of unlabeled faces. For example, a user may use a rectangle selection tool, a brush tool, and/or a lasso tool to select the one or more unlabeled faces.

Figure 4:
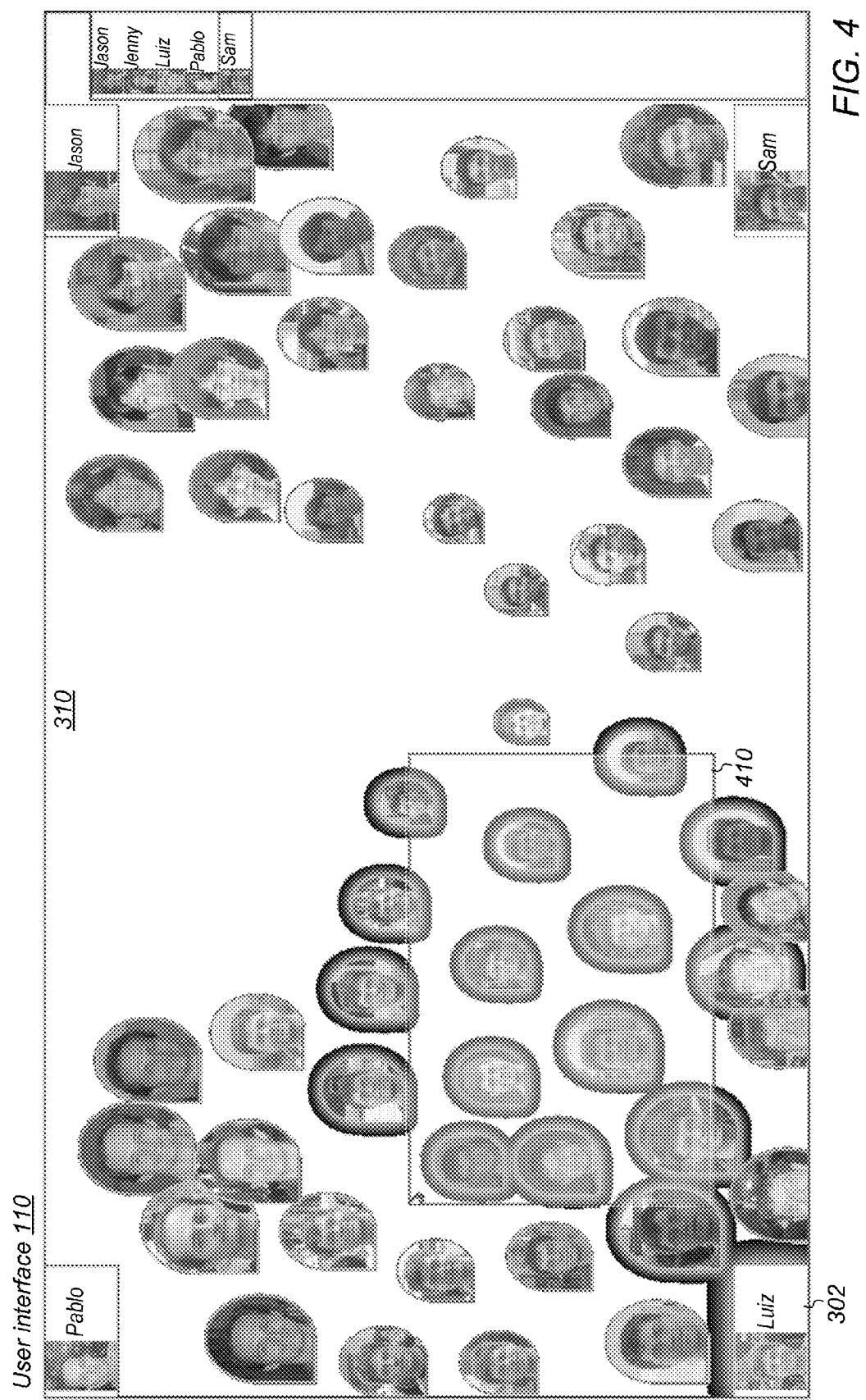
FIG. 4 illustrates an example of user selection of one or more unlabeled image elements using a rectangle selection tool, according to some embodiments.

FIG. 4 illustrates an example of user selection of one or more unlabeled image elements using a rectangle selection tool. Specifically, FIG. 4 illustrates a user selection of one or more unlabeled faces using a rectangle selection tool. As illustrated in FIG. 4, a user may select a labeled face, for example, face 302. The user may then, using a rectangle selection tool, select one or more unlabeled faces by indicating a rectangular selection region, such as region 410 illustrated in FIG. 4. The user selection of the unlabeled faces in region 410 may indicate a request to assign the label of face 302 to the unlabeled faces in region 410. More specifically, the user selection of the unlabeled faces in region 410 may indicate that the unlabeled faces in region 410 belong to the same person as face 302. Unlabeled faces that are at least partially included in the rectangular selection region indicated by the user may be selected. As an alternative embodiment, only unlabeled faces that are entirely included in the rectangular selection region may be selected.

Figure 5:
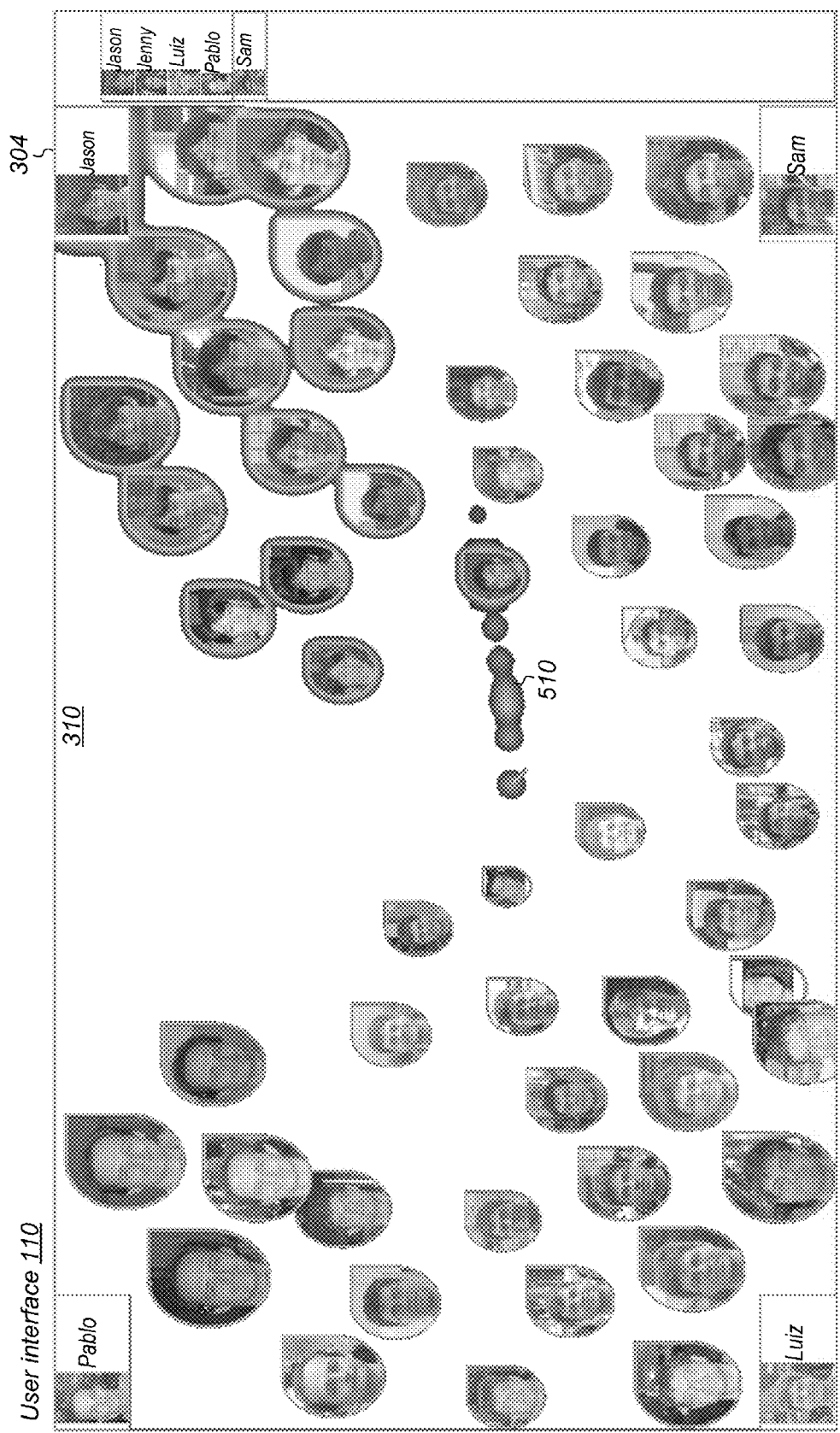
FIG. 5 illustrates an example of user selection of one or more unlabeled image elements using a brush selection tool, according to some embodiments.

FIG. 5 illustrates an example of user selection of one or more unlabeled image elements using a brush selection tool. Specifically, FIG. 5 illustrates a user selection of one or more unlabeled faces using a brush selection tool. As illustrated in FIG. 5, a user may select a labeled face, for example, face 304. The user may then, using a brush selection tool, select one or more unlabeled faces by painting a brush stroke, such as brush stroke 510 in FIG. 5, across the unlabeled faces that the user wishes to select. The user selection of the unlabeled faces via brush stroke 510 may indicate a request to assign the label of face 304 to the unlabeled faces selected via brush stroke 510. Unlabeled faces that are at least partially touched by the brush stroke of the user may be selected by the brush stroke.

Figure 6:
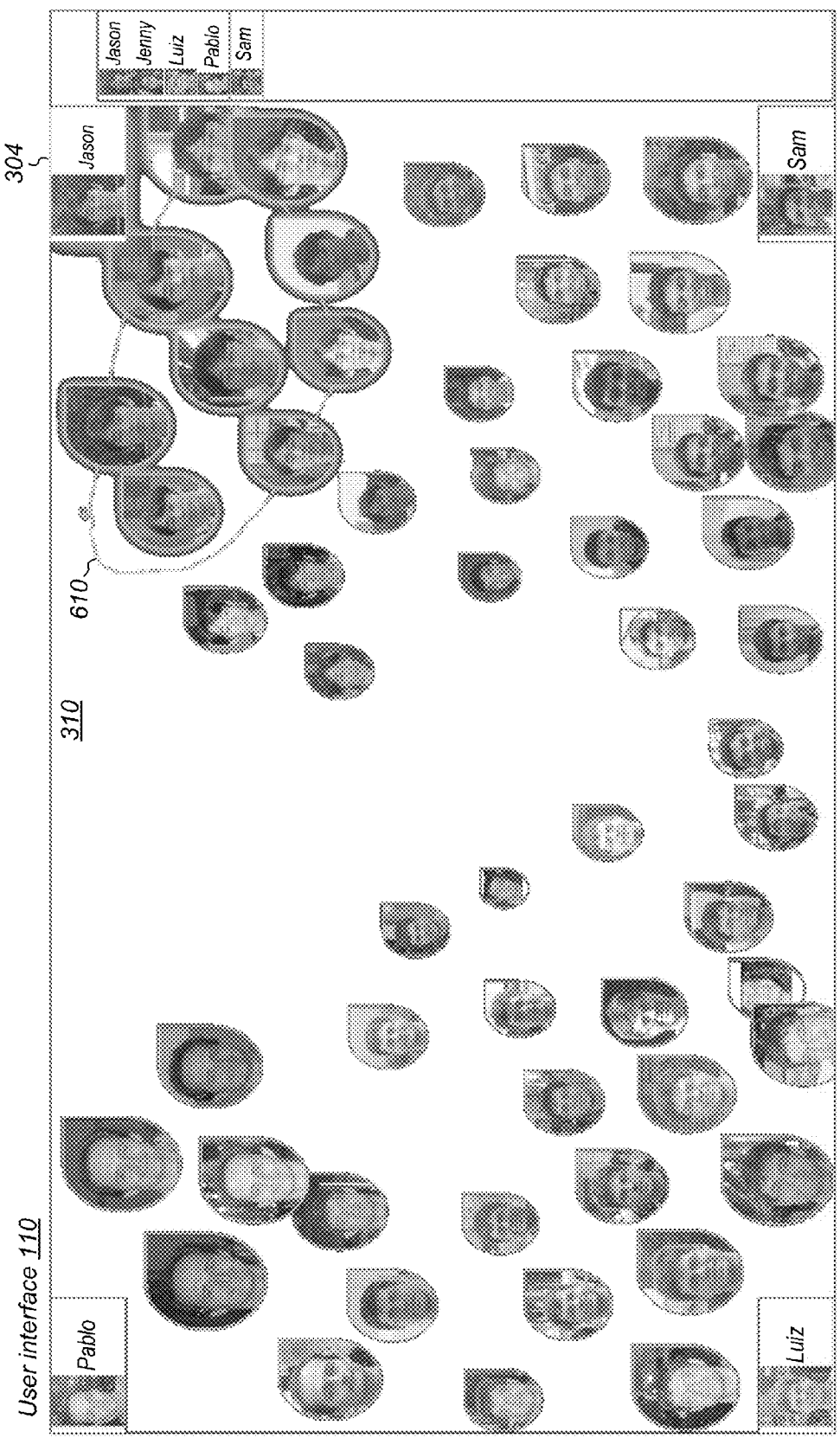
FIG. 6 illustrates an example of user selection of one or more unlabeled image elements using a lasso selection tool, according to some embodiments.

FIG. 6 illustrates an example of user selection of one or more unlabeled image elements using a lasso selection tool. Specifically, FIG. 6 illustrates a user selection of one or more unlabeled faces using a lasso selection tool. As illustrated in FIG. 6, a user may select a labeled face, for example, face 304. The user may then, using a lasso selection tool, select one or more unlabeled faces by encircling the one or more unlabeled faces with a lasso, such as lasso 610 illustrated in FIG. 6. The user selection of the unlabeled faces encircle by lasso 610 may indicate a request to assign the label of face 304 to the unlabeled faces encircled by lasso 610. Unlabeled faces that are at least partially encircled by the lasso may be selected. As an alternative embodiment, only unlabeled faces that are entirely encircled by the lasso may be selected.

Note that the examples of selecting one or more unlabeled faces via a rectangle selection tool, a brush selection tool, and a lasso selection are provided merely as examples and are not meant to be limiting. User interface 110 may provide a variety of mechanisms by which a user may select unlabeled faces. For example, a user may simply select the unlabeled faces by clicking on the display of each unlabeled face. Further note that, in some embodiments, the user may directly select the labeled face before selecting the one or more unlabeled images, as described above. As an alternative embodiment, the labeled face may be automatically selected by the system in response to the user selection of one or more unlabeled faces. For example, a labeled face which corresponds to (e.g., is most similar to) one or more selected, unlabeled faces may be automatically selected in response to the selection of the one or more unlabeled faces.

Receiving user input which indicates labels to be assigned to image elements in a collection of images may enable the image labeling system to 1) apply labels to the image elements and 2) receive training input which may allow the image labeling system to more accurately calculate similarity metrics between pairs of faces within the collection of images. The labels that are assigned to image elements may indicate additional characteristics for the image elements. For example, a label that is assigned to a face may indicate a gender, race, and/or age for the face. Accordingly, the image labeling system may use the assigned labels to more accurately determine similar faces in a set of detected faces. As described in further detail below, the image labeling system may use the user-assigned labels to recalculate similarity metrics for pairs of image elements in the collection of images. Since the recalculated similarity metrics may have the benefit of additional data (e.g., the newly applied labels), the recalculated similarity metrics may more accurately represent the similarities between pairs of faces.

As indicated at 230, the method illustrated in FIG. 2 may include assigning, dependent on the received input, the label to the at least one unlabeled image element. As described above, the user selection of the at least one unlabeled image element may indicate a request to assign a particular label (e.g., the label of a selected, labeled image element) to the selected at least one unlabeled image element. For example, as described above and as illustrated in FIGS. 4-6, a user may select a labeled face in a display region and may select at least one unlabeled face to which the label of the labeled face may be applied. In response to the user input which selects the at least one unlabeled face, image labeler 118 may assign the label to the at least one unlabeled face. Labels that are assigned to faces in a digital image may be associated with the image. For example, the face labels may be included in metadata for the image. A digital image may include several faces, each of which may have a different label. Accordingly, each face label may include information which identifies a particular face in the image that corresponds to the face label. For example, the face label may include coordinate information which may specify the location of the corresponding face in the digital image.

As indicated at 240, the method illustrated in FIG. 2 may include updating the display of unlabeled image elements. As described in further detail below, in reference to FIG. 10, display module 116 may, in response to the received input, display an updated set of unlabeled image elements. Display module 116 may remove the newly labeled image elements from the display area. Display module 116 may select a new set of unlabeled image elements for display in the display area and may display the new set of unlabeled image elements in the display area. As described in further detail below, the new set of unlabeled image elements may include any combination of previously displayed unlabeled image elements and unlabeled image elements that have not yet been displayed. Display module 116 may maintain up to a maximum number, M, of unlabeled image elements in the display area.

Figure 7:
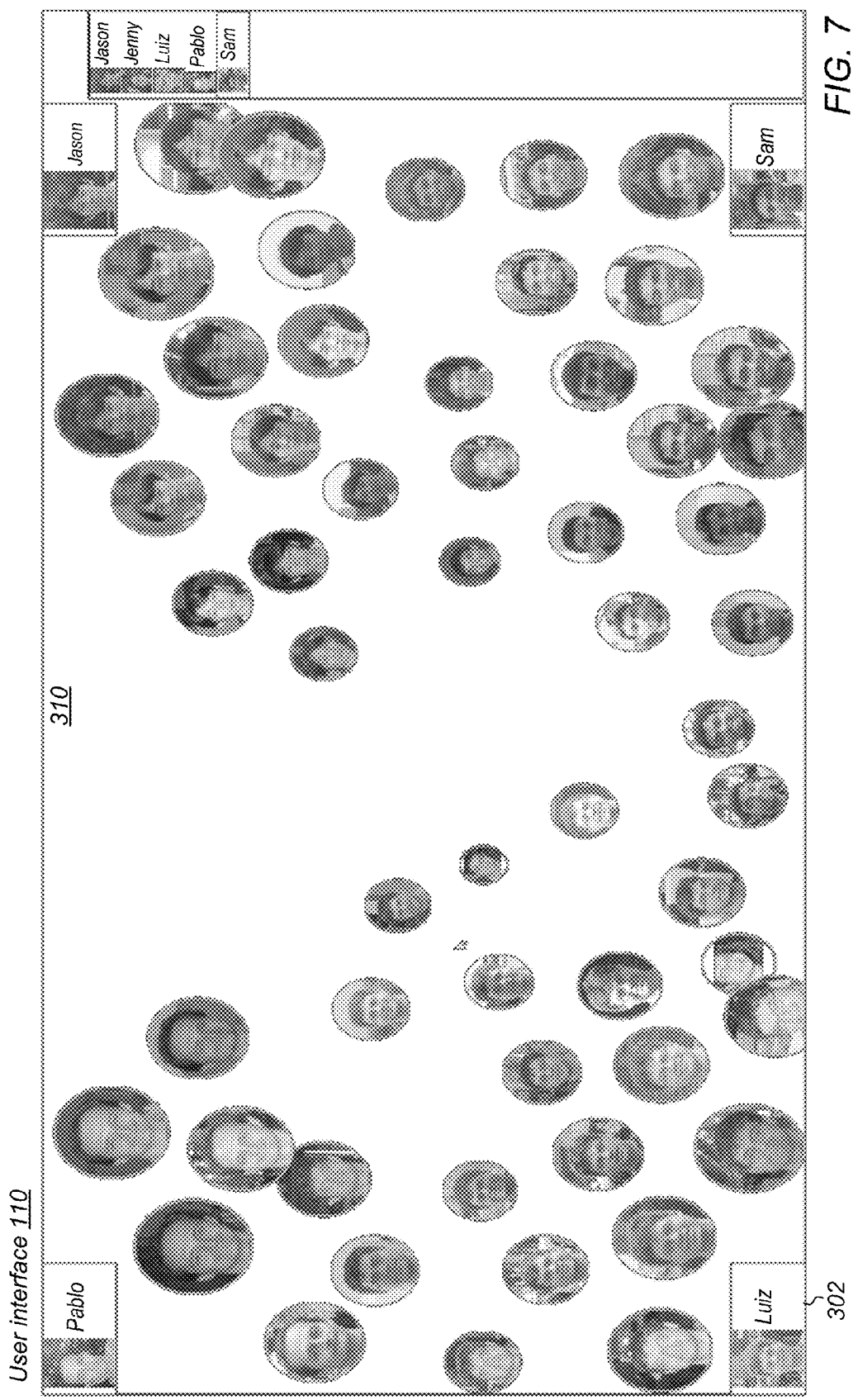
FIG. 7 illustrates an example of a display of unlabeled image elements that has been updated after receiving user input which indicates labels for one or more unlabeled image elements, according to some embodiments.

FIG. 7 illustrates an example of a display of unlabeled image elements that has been updated after receiving user input which indicates labels for one or more unlabeled image elements. More specifically, FIG. 7 illustrates an example of a display of unlabeled faces that has been updated in response to user selection which indicates labels for one or more unlabeled image elements. As shown in FIG. 7, a new set of unlabeled faces which are similar to face 302 have been displayed. The new set of unlabeled faces may be displayed in FIG. 7 in response to the user input of FIG. 4. More specifically, the user input illustrated in FIG. 7 indicates, via a rectangular selection region, a set of unlabeled faces that should receive the same label as face 302. The selected, unlabeled faces may be labeled according to the user input, removed from the display region in FIG. 7, and replaced by a new set of unlabeled faces, as illustrated in FIG. 7.

The image labeling system may, as described in further detail below, may recalculate similarity metrics for each pair of unlabeled image elements. The recalculated similarity metrics may be dependent on the newly assigned labels, and, thus may be more accurate than the previously calculate similarity metrics. The image labeling system may select the new set of unlabeled image elements for display dependent on the recalculate similarity metrics. Accordingly, the updated set of unlabeled image elements that is displayed may be more accurate matches to displayed labeled faces than a previous displayed set of unlabeled image elements.

The image labeling system may repeat blocks 200 through 240 of FIG. 2 until all detected image elements in digital collection 130 have been assigned a label. During the repeated execution of the image-labeling process, all of the unlabeled image elements in the set of detected image elements which are similar to a particular labeled image element may be found and labeled. In such a case, if additional image elements in the set of detected image elements remain to be labeled, a new labeled image element may be selected for display in the display area. As an example, the system may provide an indication to the user that all image elements which are similar to a labeled image element have been labeled. The image labeling system may remove the labeled image element from the display area and may suggest that the user select another labeled image element for the display area. In response the user may select another labeled image element, for example from the display of labeled image elements in column 320 of FIG. 3. The user may drag the selected labeled image element into the display area. In response, the image labeling system may update the display of unlabeled image elements, using a method similar to that described above for block 220 of FIG. 2.

Figure 8:
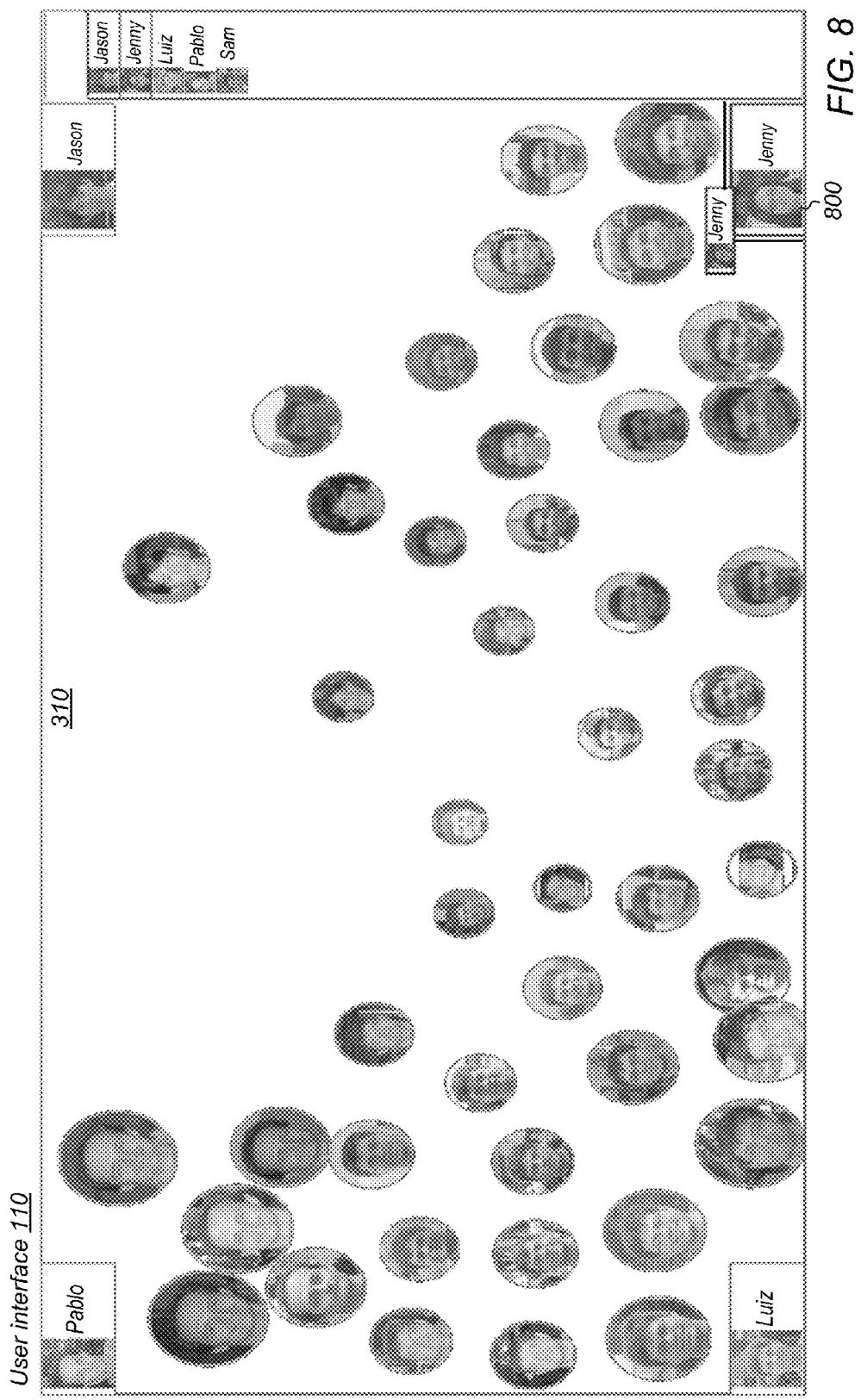
FIG. 8 illustrates an example of a new labeled image element that has been selected and placed in the display area, according to some embodiments.

In other embodiments, the image-labeling system may identify the labeled image elements which have the highest amount of similar, unlabeled image elements remaining in the set of detected image elements. The image-labeling system may automatically add one or more of these identified labeled faces to the display area. As an alternative, the image-labeling system may request that the user select one of the identified labeled image elements. As yet another example, at any point during the execution of the image-labeling process, a user may manually replace a labeled image element in the display area with another labeled image element. The user may replace a labeled image element by selecting a new image element, for example from column 320, and dragging the new image element to the area occupied by the existing labeled image element. In response to the user input, the image-labeling system may replace the existing labeled image element with the new labeled image element. The system may also update the display of unlabeled image elements to include FIG. 8 illustrates an example of a new labeled image element that has been selected and placed in the display area. For example, labeled face 306 illustrated in FIG. 3 has been replaced by labeled face 800 in FIG. 8. The unlabeled faces in FIG. 8 have not yet been updated to reflect the addition of a new labeled face.

Display Unlabeled Image Elements

Figure 9:
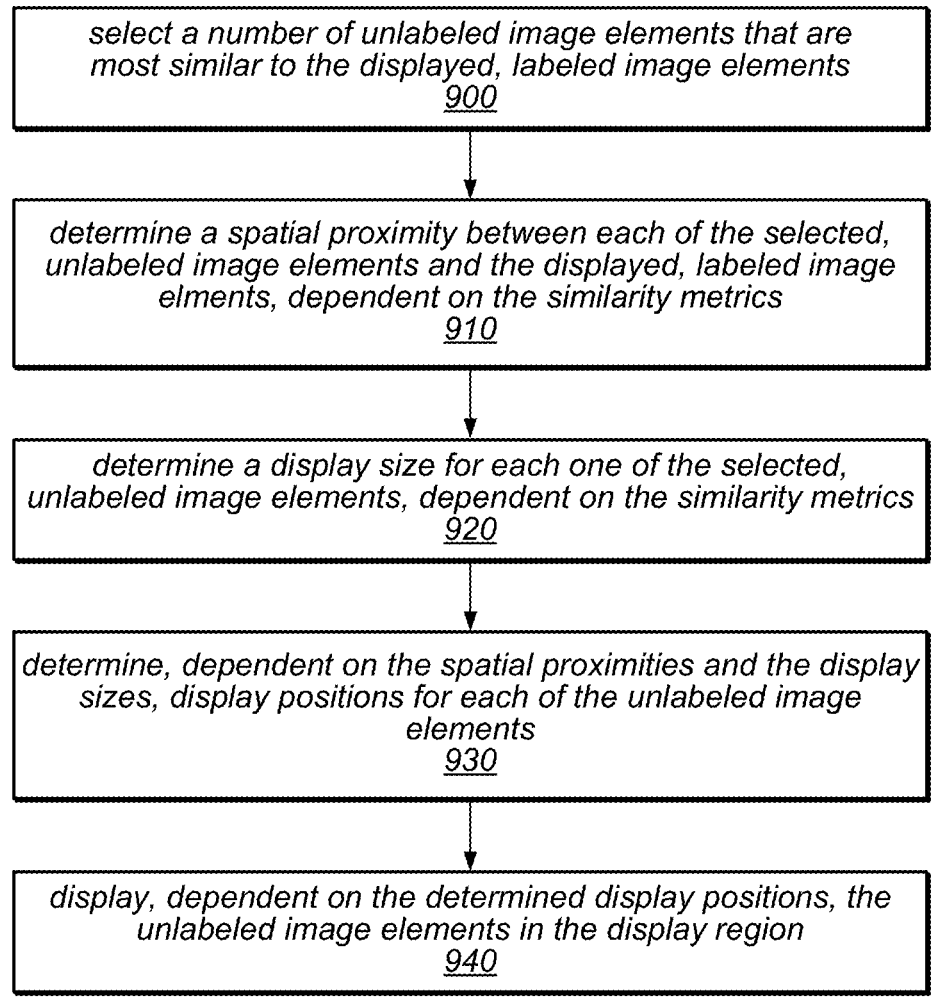
FIG. 9 is a flowchart of a method for displaying unlabeled image elements in a display area, according to some embodiments.

As described above, in reference to block 210 of FIG. 2, unlabeled image elements may be displayed in the display area dependent on similarities between the unlabeled image elements and labeled image elements that are displayed in the same display area. For example, the spatial proximity of the unlabeled image elements to the labeled image elements may be dependent on similarities between the unlabeled image elements and the labeled image elements. As another example, the display size of each unlabeled image element may be dependent on similarities between the unlabeled image element and a labeled image element in the same display area. A display of unlabeled image elements in a display area may contain a maximum number of image elements and the image elements may be displayed such that there is a minimum amount of overlap of the unlabeled image elements. FIG. 9 is a flowchart of a method for displaying unlabeled image elements in a display area. As an example, display module 116 may be configured to implement the method of FIG. 9 to display unlabeled faces in a display area, such as illustrated in FIG. 3.

As illustrated in FIG. 3, a display region may include a display of a number of labeled image elements (e.g., faces) which are displayed in different portions of the display region. As indicated at 900, the method illustrated in FIG. 9 may include selecting a number of unlabeled image elements that are most similar to the displayed, labeled image elements. For example, display module 116 may select, from a set of unlabeled faces, a subset of unlabeled faces that are most likely to correspond to the labeled faces displayed in a display region. As described above, and in further detail below, each pair of faces in a set of detected faces for a digital image collection may have a corresponding similarity metric. The similarity metric for a pair of faces may indicate the probability that the faces belong to the same person.

Display module 116 may retrieve a similarity metric for each possible pair of an unlabeled face and a displayed, labeled face. Display module 116 may sort the unlabeled faces dependent on the retrieved similarity metrics. More specifically, display module 116 may sort the unlabeled faces such that unlabeled faces at the top of the sorted list have the highest probability of matching the displayed, labeled faces. Display module 116 may select the top M (e.g., the maximum number of unlabeled faces) number of unlabeled faces from the sorted list for display in the display area. Accordingly, display module 116 may have a higher probability of displaying unlabeled faces that are likely to match the displayed, labeled faces.

As indicated at 910, the method illustrated in FIG. 9 may include determining a spatial proximity between each of the selected, unlabeled image elements and the displayed, labeled image elements, dependent on the similarity metrics. As an example, display module 116 of image labeling module 100 may determine a spatial proximity between each selected, unlabeled face and each displayed, labeled face. The spatial proximity for an unlabeled face may be dependent on the similarity metrics that correspond to the unlabeled face. The unlabeled face may have, for each of the displayed, labeled faces, a respective similarity metric that pairs the unlabeled face with a displayed labeled face and indicates the probability that the pair of faces belong to the same person.

Display module 116 may calculate a distance between the unlabeled face and one or more of the displayed, labeled faces, dependent on the similarity metrics for the unlabeled face and the one or more displayed, labeled faces. The calculated distance may be a spatial proximity, in the display region, between the unlabeled face and one or more displayed, labeled face. The spatial proximity, in the display region, of an unlabeled face to a labeled face may indicate a probability that the faces belong to the same person. For example, a closer spatial proximity between an unlabeled face and a labeled face indicates a higher probability that the faces belong to the same person. Locating unlabeled faces, which are a likely match to a labeled face, in close spatial proximity to the labeled face may enable a user to easily select the unlabeled faces. For example, as illustrated in FIG. 6, a user may easily, using a lasso selection tool, select unlabeled faces that are all close to labeled face 304.

In some embodiments, display module 116 may determine a spatial proximity between an unlabeled face and a displayed, labeled face that is most similar to the unlabeled face. The spatial proximity may a distance value that may be determined dependent on the similarity metric between the unlabeled face and the displayed, labeled face that is most similar to the unlabeled face. Display module 116 may use various methods to convert the similarity metric to a distance value. For example, display module 116 may linearly interpolate the similarity metric between the labeled face and the unlabeled face. The distance value may be inversely proportional to the similarity metric. For example, a higher probability similarity metric may result in a smaller distance value. From the distance value, display module 116 may determine a coordinate position, within the display region, for the unlabeled face. The determined coordinate position may specify a display position for the unlabeled face that is equivalent to the determined distance value between the unlabeled face and the labeled face. Accordingly, the spatial proximity of the unlabeled face to the labeled face may indicate the probability that the faces belong to the same person.

In other embodiments, display module 116 may determine spatial proximities between an unlabeled face and all of the displayed, labeled faces. The spatial proximities may be distance values that may be determined dependent on the similarity metrics between the unlabeled face and all of the displayed, labeled faces. For example, display module 116 may convert each similarity metric to a distance value by linearly interpolating the similarity metrics. Similarly as described above, each distance value may be inversely proportional to a respective similarity metric. For example, a higher probability similarity metric may result in a smaller distance value. From the distance values, display module 116 may determine a coordinate position, within the display region, for the unlabeled face. The determined coordinate position may be the coordinate position that best satisfies each of the distance values between the unlabeled face and each of the displayed, labeled faces. Accordingly, the spatial proximity of the unlabeled face to each one of the displayed, labeled faces may indicate the probability that the faces belong to the same person.

FIG. 3 illustrates an example of unlabeled faces displayed in a display area dependent on similarity metrics. As illustrated in FIG. 3, unlabeled faces are clustered towards similar labeled faces in the corners of the display area. The spatial proximity of each unlabeled face to a labeled face in FIG. 3 indicates a probability that the two faces belong to the same person. For example, unlabeled face 302*a* has a close spatial proximity to labeled face 302 and unlabeled face 302*b* has a farther spatial proximity to labeled face 302. The closer spatial proximity of unlabeled face 302*a* indicates that the probability that unlabeled face 302*a* matches labeled face 302 is higher than the probability that unlabeled face 302*b* matches labeled face 302.

As indicated at 920, the method illustrated in FIG. 9 may include determining a display size for each one of the selected, unlabeled image elements, dependent on the similarity metrics. As an example, display module 116 of image labeling module 100 may determine an initial display position for each selected, unlabeled face. The display size for an unlabeled face may be dependent on the similarity metrics that correspond to the unlabeled face. The unlabeled face may have, for each of the displayed, labeled faces, a respective similarity metric that pairs the unlabeled face with a displayed labeled face and indicates the probability that the pair of faces belong to the same person.

Display module 116 may calculate a display size for an unlabeled face dependent on the similarity metric between the unlabeled face and the most similar displayed, labeled face. The display size of an unlabeled face may indicate a probability that the unlabeled face and a closest displayed, labeled face belong to the same person. Display module 116 may convert the similarity metric for the unlabeled face and labeled face pair to a size scale. Display module 116 may determine the size of the display of the unlabeled face dependent on the size scale. As an example, for a similarity metric that indicates a probability above a threshold value (e.g., 70% probability that two faces belong to a same person), display module 116 may enlarge the display of the unlabeled face. As another example, for a similarity metric that indicates a probability below a threshold value (e.g., 30% probability that two faces belong to a same person), display module 116 may reduce the display of the unlabeled face. Accordingly, larger unlabeled face displays indicate higher probabilities that the unlabeled faces are a match to a corresponding displayed, labeled face.

FIG. 3 illustrates different size displays for the unlabeled faces. For example, the display size of unlabeled face 302*a* is larger than the display size of unlabeled face 302*b*. The larger display size of unlabeled face 302*a* indicates that the probability that unlabeled face 302*a* matches labeled face 302 is higher than the probability that unlabeled face 302*b* matches labeled face 302. As illustrated in FIG. 3, larger display sizes for unlabeled faces may indicate a higher probability that an unlabeled face is the same as a labeled face. The image labeling system may select a larger display size for unlabeled faces with higher probability of similarity to a labeled face in order to draw a user's attention to such higher probability faces.

As described above, the image labeling system may receive additional training information each time a user labels a face and, thus, may be able to provide more accurate displays of unlabeled faces. Accordingly, it may be beneficial for the image labeling system to receive user feedback (e.g., labels) on high probability faces as early as possible in the face labeling process in order to gain additional data for lower probability faces. Based on the user feedback, the system may be able to improve the probabilities of the lower probability faces, and, therefore, may be able to provide more accurate displays of unlabeled faces. Accordingly, it may be beneficial to the efficiency of the image labeling system to call a user's attention to high probability faces in order to encourage the user to provide labels for such faces early in the face labeling process.

In other embodiments, the image labeling system may use different characteristics to visually indicate similarities between labeled and unlabeled image elements. As an example, the image labeling system may use just spatial proximity to indicate similarities between labeled and unlabeled image elements. As another example, the image labeling system may use spatial proximity in addition to other characteristics that may direct a user's attention to high probability image elements. For example, the image labeling system may display high probability image elements in highlighted colors or as distinctive shapes As indicated at 930, the method illustrated in FIG. 9 may include determining, dependent on the spatial proximities and the display sizes, display positions for each of the unlabeled image elements. The display position for each of the unlabeled image elements may be determined such that there is a minimum amount of overlap between the displays of the unlabeled image elements. Unlabeled image elements that are displayed with too much overlap may be obscured such that a user may not be able see enough of the image element to identify content in the image element. If a user cannot identify content in the unlabeled image element, the user may not be able to effectively indicate a label for the unlabeled image element.

The image labeling system may specify a maximum amount of overlap that may be acceptable for the unlabeled image elements in the display region. For example, the image labeling system may specify that a maximum of 15% of an unlabeled image element may be covered by another, overlapping unlabeled image element. The amount of maximum amount of acceptable overlap for unlabeled image elements may also be a parameter that is configurable by a user via user options or preferences in user interface 110. Display module 116 may adjust the display positions of the unlabeled image elements such that any overlap between unlabeled image elements is below the maximum specified amount of overlap. For example, display module 116 may adjust the display positions of a set of unlabeled faces to minimize overlap between the displays of the unlabeled faces.

Display module 116 may use the particle system to determine a display position for each unlabeled face such that the display of the unlabeled image elements satisfies the criteria for maximum allowable overlap between unlabeled image elements. The particle system may determine the display locations dependent on the determined display size for each of the unlabeled faces and dependent on the desired spatial proximity between the unlabeled faces and the displayed, labeled faces. As described above, distance values (e.g., spatial proximities) between each unlabeled face and each labeled face may be determined by linearly interpolating the similarity metrics between the unlabeled face and the displayed labeled faces. Display module 116 may use the desired distance values between unlabeled and labeled faces and the display size of each unlabeled face as inputs to the particle system. The particle system may determine a display position for each unlabeled image element that best satisfies the criteria for distance values, display size and maximum amount of overlap.

Dependent on the distance values described above, each unlabeled face may have an optimal display location in the display area. The optimal display location may position the unlabeled face in the display area such that desired spatial proximities between the unlabeled face and one or more of the unlabeled faces are optimally satisfied. The particle system may assign, to each unlabeled face, an attractive force which may act to pull the unlabeled face toward the optimal display location for the unlabeled face. The particle system may assign, to each pair of unlabeled faces, a repulsive force which may act to minimize overlap between the displays of the unlabeled faces. For example, a repulsive force between a pair of unlabeled faces may be zero if the unlabeled faces do not overlap. However, if the unlabeled faces are moved such that they begin to overlap, the strength of the repulsive force may rapidly increase. The display location of an unlabeled face may be determined by computing a display location that results in an equilibrium status between the attractive forces and repulsive forces for the unlabeled face. One example of such a particle system is described in U.S. Pat. No. 7,123,269 entitled "Creating and Manipulating Related Vector Objects in an Image," filed Jun. 21, 2002, the content of which is incorporated by reference herein in its entirety.

As indicated at 940, the method illustrated in FIG. 9 may include displaying, dependent on the determined display positions, the unlabeled image elements in the display region. Since the display positions have been determined to minimize overlap between the unlabeled image elements, the unlabeled image elements may be displayed such that overlap between the unlabeled image elements is minimized. FIG. 3 illustrates an example of unlabeled faces that may be displayed in a display region using the above described particle system. Note that the unlabeled faces in FIG. 3 have been displayed such that only a few of the unlabeled faces are overlapping. For the unlabeled face displays that overlap, in FIG. 3, the overlap has been restricted to a maximum amount of overlap. For example, unlabeled faces 300b and 300c are displayed such that unlabeled face 300c overlaps unlabeled face 300b. However, the overlap does not obscure the identity of unlabeled face 300b.

Figure 10:
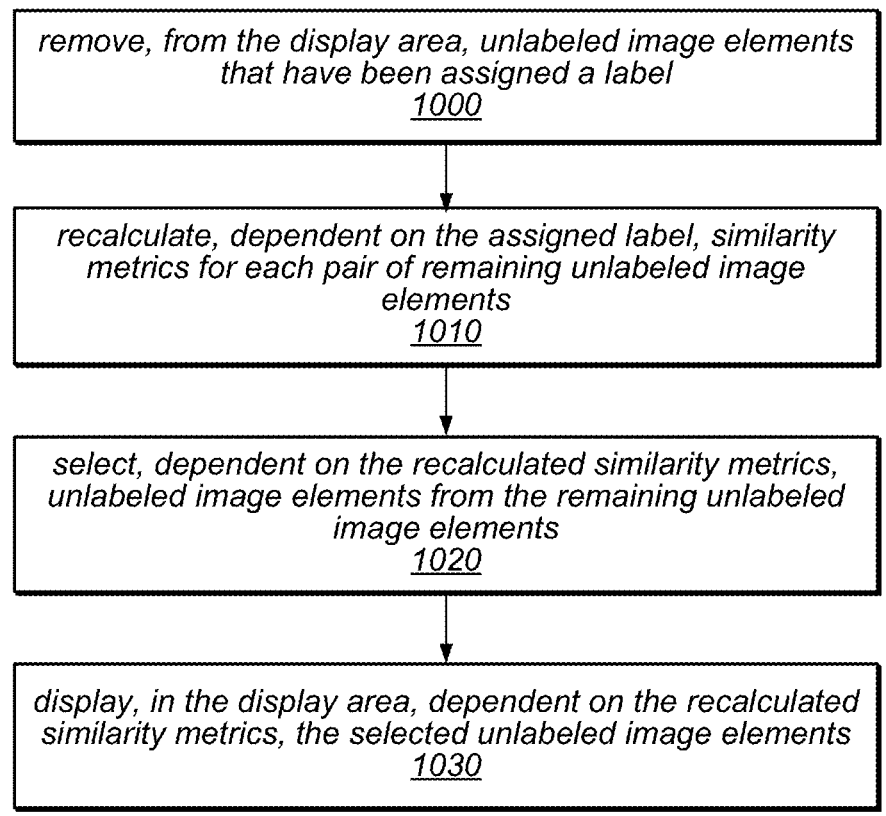
FIG. 10 is a flowchart of a method for updating a display of unlabeled image elements in a display area, according to some embodiments.

As described above, in reference to block 240 of FIG. 2, the display of unlabeled image element may be updated subsequent to receiving user input which indicates labels for one or more of the unlabeled image elements. FIG. 10 is a flowchart of a method for updating a display of unlabeled image elements in a display area. As indicated at 1000, the method illustrated in FIG. 10 may include removing, from the display area, unlabeled image elements that have been assigned a label. For example, subsequent to receiving user-indicated labels for one or more unlabeled faces, display module 116 may remove the newly labeled faces from the display area. The labeled faces may be removed from the display area in order to allow a new set of unlabeled faces to be added to the display area.

As indicated at 1010, the method illustrated in FIG. 10 may include recalculating, dependent on the assigned label, the similarity metrics for each pair of remaining unlabeled image elements. The image labeling system may receive, from the new labels that the user has indicated should be assigned to the one or more unlabeled image elements, additional information regarding characteristics of image elements. As an example, labels that are assigned to faces may indicate additional characteristics such as race, age and gender. The additional characteristics indicated by the labels may enable the image labeling system to more accurately determine similar image elements. Therefore, the image labeling system may recalculate the similarity metrics for each pair of the remaining unlabeled image elements. As an example, similarity engine 114 may recalculate the similarity metrics using a method similar to that described above. Recalculating the similarity metrics dependent on label information received from a user may enable the image labeling system to improve the accuracy of the display of unlabeled image elements throughout the image labeling process.

As indicated at 1020, the method illustrated in FIG. 10 may include selecting, dependent on the recalculated similarity metrics, unlabeled image elements from the remaining unlabeled image elements. For example, the image labeling system may select a set of one or more unlabeled faces for display in the display area. The image labeling system may select the one or more unlabeled faces using a method similar to that described above in reference to block 210 of FIG. 2. As described above, the one or more unlabeled faces selected for display may include unlabeled faces that have previously been displayed and unlabeled faces that have not previously been displayed.

As indicated at 1030, the method illustrated in FIG. 10 may include displaying, in the display area, dependent on the recalculated similarity metrics, the selected unlabeled image elements. Display module 116 may use a method similar to the method described above in reference to FIG. 9 to display the selected unlabeled image elements. For example, the spatial proximity in the display of each unlabeled image element to one or more displayed, labeled image elements may be dependent on the similarity metrics between the unlabeled image element and at least one of the displayed, labeled image elements. The display size of each unlabeled image element may also be dependent on the similarity metrics between the unlabeled image element and at least one of the displayed, labeled image elements. Furthermore, the unlabeled image elements may be displayed such that overlap between the unlabeled image elements is minimized.

Figure 11:
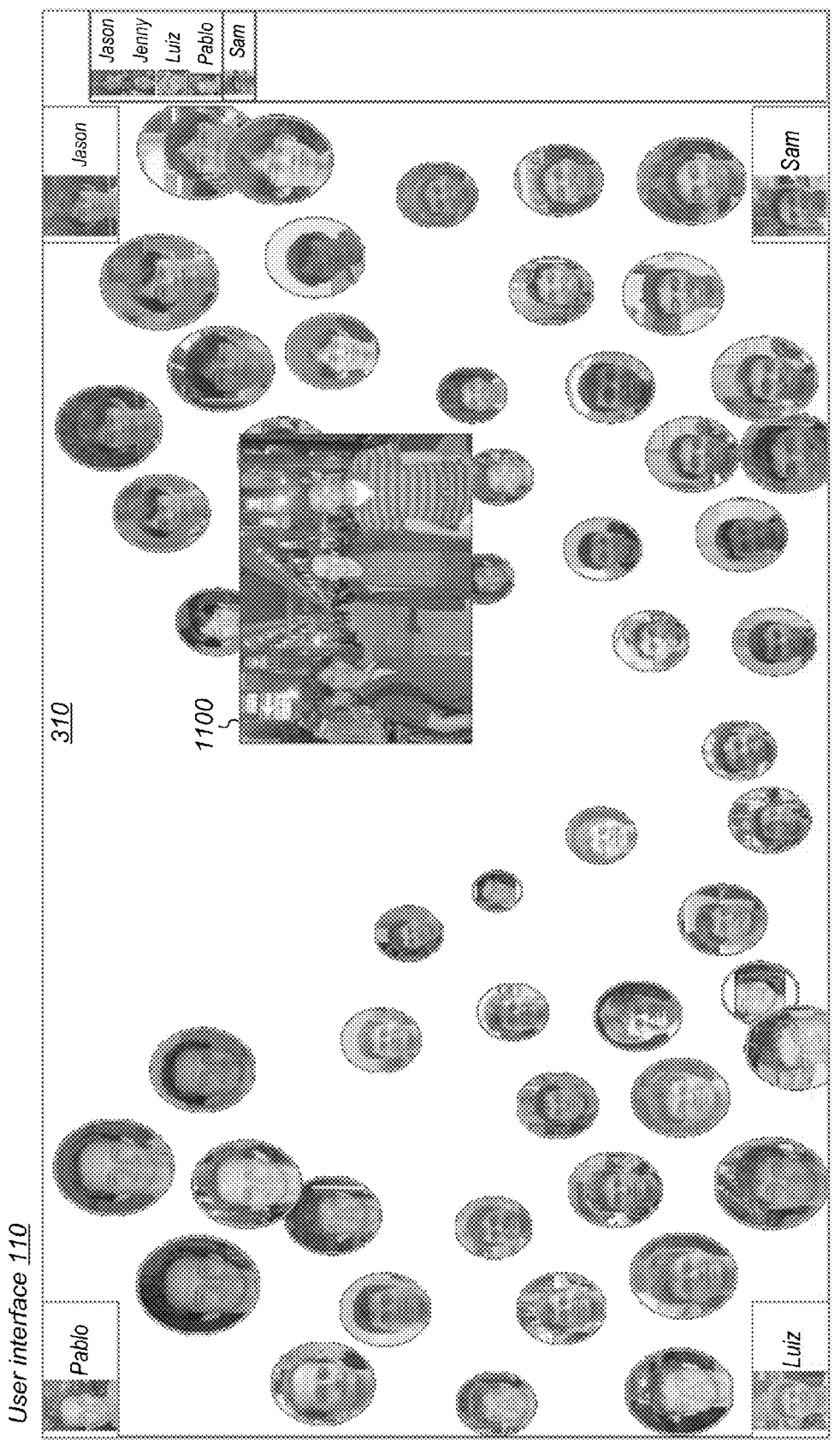
FIG. 11 illustrates an example display of a source image for an image element, according to some embodiments.

The image labeling system, in various embodiments, may provide a number of user interface, and/or control, elements for a user. As an example, a user may be unsure of the identity of a particular unlabeled face that is displayed in the display area. Image labeling module 100 may provide, via user interface 110, a mechanism via which the user may view the source image that corresponds to the unlabeled face. As an example, the user may right-click on the display of the unlabeled face and the system may display the source image for the unlabeled face. In some embodiments, the system may overlay the source image on the display of unlabeled faces. FIG. 11 illustrates an example of a source image for an unlabeled face that has been overlaid over the display of the unlabeled faces.

Figure 12:
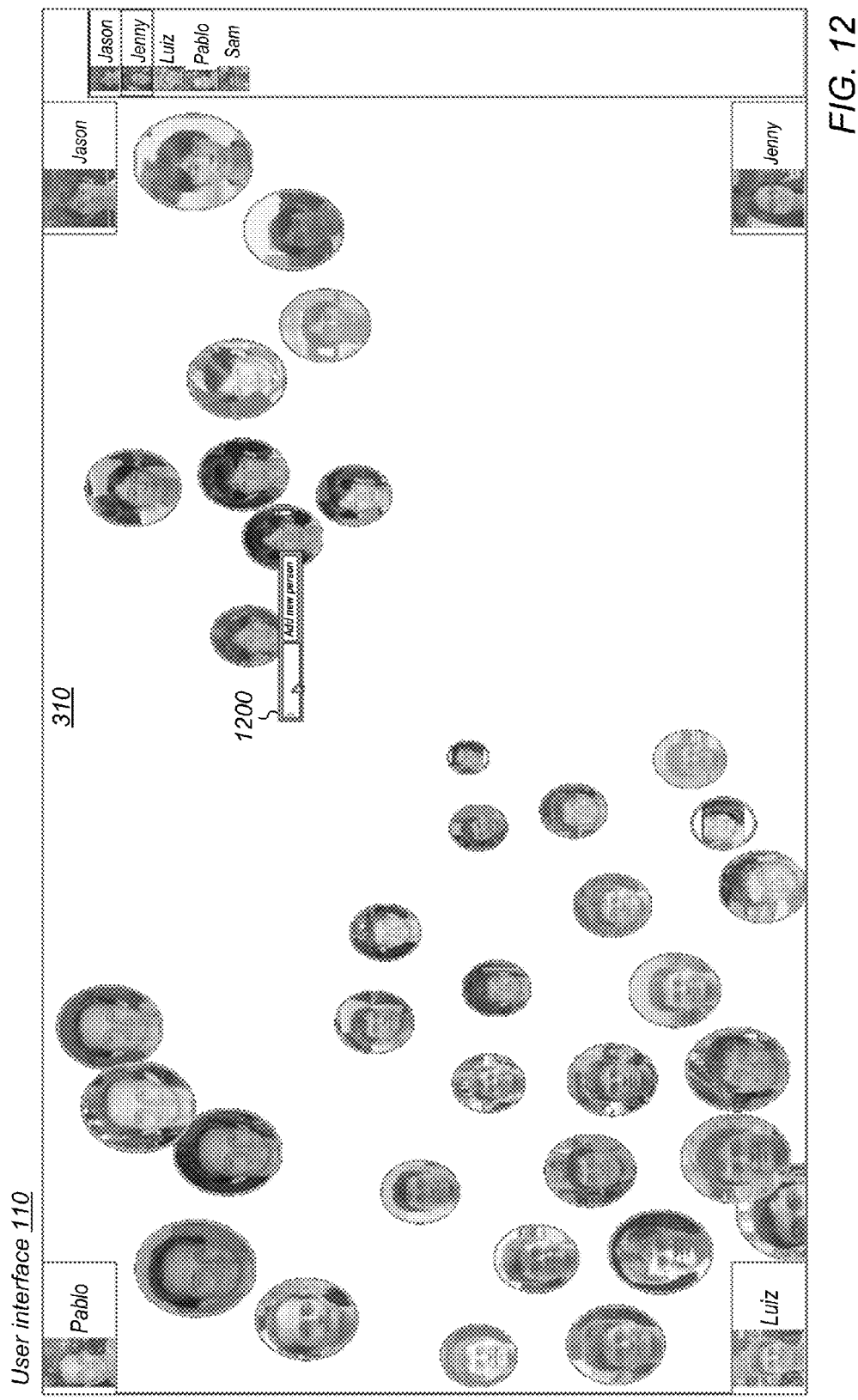
FIG. 12 illustrates an example of a user applying a label directly to an unlabeled image element, according to some embodiments.

The image labeling system may also provide a mechanism by which a user may assign a label directly to a particular unlabeled image. The label that a user may assign directly to the particular unlabeled image may be a new label that the user has not previously defined. As an alternative, the label may be an existing label that the user would like to assign directly to an unlabeled image without having to first display an image which corresponds to the label. As an example, the image labeling system may enable a user to provide text input that may specify a label for an unlabeled image element. FIG. 12 illustrates an example of a user applying a label to an unlabeled face via a text entry box. As illustrated in FIG. 12, user interface 110 may display a text entry box, such as 1200, that may enable a user to enter a label for an unlabeled face. The label entered by the user into the text entry box may be a new label or may be an existing label. The image labeling system may apply the label indicated by the user's text entry to a selected unlabeled face. Text entry box 1200 may be displayed in response to a user request to assign a label directly to an unlabeled image. For example, the user may right-click on an unlabeled face and select a menu item such as, "Assign label to face."

Figure 13:
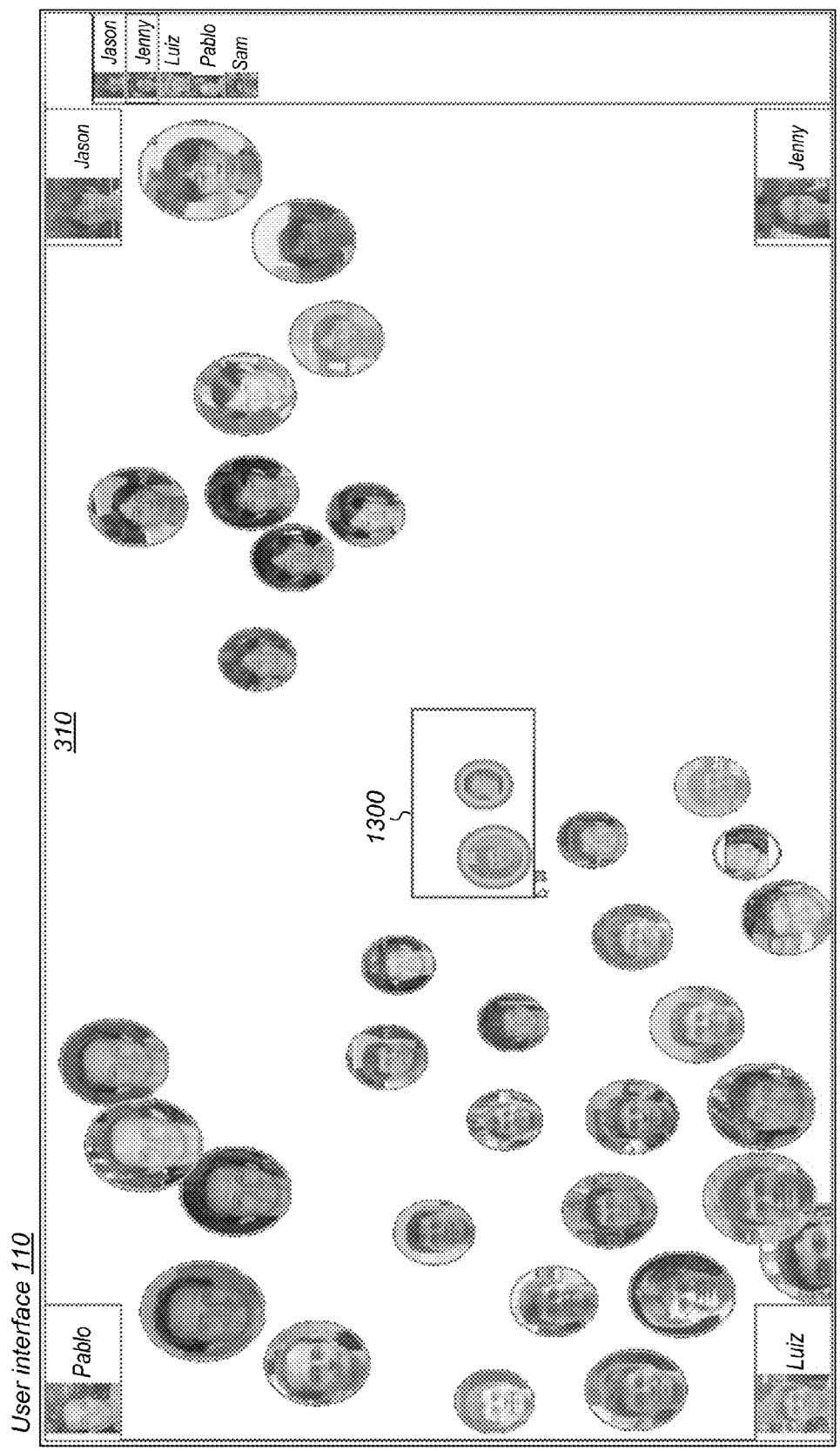
FIG. 13 illustrates an example of a user selecting unlabeled image elements for removal from the display area, according to some embodiments.

The image labeling system may also provide a mechanism by which a user may remove one or more of the unlabeled image elements from the display. FIG. 13 illustrates an example of a user selecting unlabeled image elements for removal from the display area. As illustrated in FIG. 13, the user has selected two faces for removal from the display area. The user may remove the selected faces via a variety of different mechanisms in user interface 110. For example, the user may select a menu item, such as "delete faces," or "remove faces." As another example, the user may press the "Delete" key on a keyboard. The selected faces may be removed from the display area and may remain as unlabeled faces in the set of detected faces. The user's removal of the unlabeled images may serve as negative feedback to the image labeling system. For example, the user removal may indicate that the removed faces are not the same as any of the labeled faces that are displayed in the display area.

The image labeling system may not be restricted to labeling faces in digital images. As an example, the image labeling system may be applied to labeling any content in images. As another example, the image labeling system may be applied to labeling content in video scenes. As yet another example, the image labeling system may be applied to labeling web page designs to indicate design styles for the web pages. The methods of the image labeling system described herein may be applied to any type of labeling system that is based on a similarity comparison. The image labeling system described herein may provide a system for propagating labels to a large collection of items from a small number of initial items which are given labels. The system may be applied to a collection of items for which visual representations of the items may be generated. As an example, the image labeling system may be used for classifying and/or labeling a large set of pdf files, based on similarities between visual representations of the pdf files.

In other embodiments, the image labeling system may be used to explore a large collection of images to locate a desired image. An exploration of the collection of images may be necessary, rather than a direct search, when a search query item is not available. For example, a user may want to find a particular type of beach scene with a particular palm tree in a collection of images, but may not have a source search query entry to provide to a search system. The user may just have a general idea of the desired scene. The user may use the image labeling system to narrow down the collection of images to locate the desired scene. For example, the user may select and label one beach scene in the images and place the image in one corner of the display area. The user may label other image, for example, an image of a tree scene, and place the images in other corners of the display area.

The user may execute the image labeling system and the system may locate images with similar beach scenes and similar tree scenes from the collection of images. The user may select some of the located images as images which are closer to the desired image and place these images in the corners of the display area and may again execute the image labeling system to locate more similar images. The user may repeat this process, continually replacing the corner images with images that are closer to the desired image. In this manner, the image labeling system may help the user converge the collection of images into a set of images that closely resemble the user's desired image. The user may continue the process until the desired image is located.

Example System

Various components of embodiments of methods as illustrated and described in the accompanying description may be executed on one or more computer systems, which may interact with various other devices. One such computer system is illustrated by FIG. 14. In different embodiments, computer system 1400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1400 includes one or more processors 1410 coupled to a system memory 1420 via an input/output (I/O) interface 1430. Computer system 1400 further includes a network interface 1440 coupled to I/O interface 1430, and one or more input/output devices 1450, such as cursor control device 1460, keyboard 1470, multitouch device 1490, and display(s) 1480. In some embodiments, it is contemplated that embodiments may be implemented using a single instance of computer system 1400, while in other embodiments multiple such systems, or multiple nodes making up computer system 1400, may be configured to host different portions or instances of embodiments. For example, in one embodiment some elements may be implemented via one or more nodes of computer system 1400 that are distinct from those nodes implementing other elements.

In various embodiments, computer system 1400 may be a uniprocessor system including one processor 1410, or a multiprocessor system including several processors 1410 (e.g., two, four, eight, or another suitable number). Processors 1410 may be any suitable processor capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA.

In some embodiments, at least one processor 1410 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods as illustrated and described in the accompanying description may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1420 may be configured to store program instructions and/or data accessible by processor 1410. In various embodiments, system memory 1420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those for methods as illustrated and described in the accompanying description, are shown stored within system memory 1420 as program instructions 1425 and data storage 1435, respectively. In other embodiments, program instructions and/or data may be received, sent or stored upon different types of computer-accessible media or on similar media separate from system memory 1420 or computer system 1400. Generally speaking, a computer-accessible medium may include storage media or memory media such as magnetic or optical media, e.g., disk or CD/DVD-ROM coupled to computer system 1400 via I/O interface 1430. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1440.

In one embodiment, I/O interface 1430 may be configured to coordinate I/O traffic between processor 1410, system memory 1420, and any peripheral devices in the device, including network interface 1440 or other peripheral interfaces, such as input/output devices 1450. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. In addition, in some embodiments some or all of the functionality of I/O interface 1430, such as an interface to system memory 1420, may be incorporated directly into processor 1410.

Network interface 1440 may be configured to allow data to be exchanged between computer system 1400 and other devices attached to a network, such as other computer systems, or between nodes of computer system 1400. In various embodiments, network interface 1440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1450 may, in some embodiments, include one or more display terminals, keyboards, keypads, touchpads, scanning devices, voice or optical recognition devices, or any other devices suitable for entering or retrieving data by one or more computer system 1400. Multiple input/output devices 1450 may be present in computer system 1400 or may be distributed on various nodes of computer system 1400. In some embodiments, similar input/output devices may be separate from computer system 1400 and may interact with one or more nodes of computer system 1400 through a wired or wireless connection, such as over network interface 1440.

As shown in FIG. 14, memory 1420 may include program instructions 1425, configured to implement embodiments of methods as illustrated and described in the accompanying description, and data storage 1435, comprising various data accessible by program instructions 1425. In one embodiment, program instructions 1425 may include software elements of methods as illustrated and described in the accompanying description. Data storage 1435 may include data that may be used in embodiments. In other embodiments, other or different software elements and/or data may be included.

Those skilled in the art will appreciate that computer system 1400 is merely illustrative and is not intended to limit the scope of methods as illustrated and described in the accompanying description. In particular, the computer system and devices may include any combination of hardware or software that can perform the indicated functions, including computers, network devices, internet appliances, PDAs, wireless phones, pagers, etc. Computer system 1400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1400 may be transmitted to computer system 1400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc. Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method comprising:
    displaying, in a display, two or more labeled image elements corresponding to one or more images, each of the two or more labeled image elements comprising a different label and each of the two or more labeled image elements being displayed in a different region of the display;
    displaying, in the display, one or more unlabeled image elements at a distance relative to at least one of the displayed labeled image elements, the distance being dependent on a determined similarity between a respective unlabeled image element and a respective labeled image element;
    receiving a selection of at least one displayed unlabeled image element;
    responsive to receiving the selection of the at least one displayed unlabeled image element, automatically selecting a labeled image element that is most similar to the selected unlabeled image element; and
    responsive to receiving user input, assigning a label of the automatically selected labeled image element to the selected unlabeled image element.

2. The method of claim 1,
    wherein the determined similarity is determined by calculating a similarity metric between the one or more unlabeled image elements and at least one of the two or more labeled image elements.

3. The method of claim 2, further comprising determining a display size for each displayed unlabeled image element based on the similarity metric for the respective unlabeled image element relative to the respective labeled image element.

4. The method of claim 1, further comprising:
    responsive to assigning the label, automatically updating the display to include an additional unlabeled image element.

5. The method of claim 4, wherein automatically updating the display comprises:
    removing, from the display, the selected unlabeled image element to which the label is assigned; and
    displaying, in the display, the additional unlabeled image element at a distance relative to at least one of the displayed labeled image elements.

6. The method of claim 1, wherein the two or more labeled image elements are faces detected in the corresponding one or more images.

7. A computer-readable storage device storing program instructions that, responsive to execution, direct a computer to perform operations comprising:
    locating a plurality of image elements in the collection of images;
    displaying, in a display area, two or more labeled image elements from the plurality of image elements, each of the two or more labeled image elements comprising a different label and each of the two or more labeled image elements being displayed in a different region of the display area;
    displaying, in the display area, one or more unlabeled image elements from the plurality of image elements at a distance relative to at least one of the displayed labeled image elements, the distance being dependent on similarities between a respective unlabeled image element and a respective labeled image element;
    receiving a selection of at least one displayed unlabeled image element;
    responsive to receiving the selection of the at least one displayed unlabeled image element, automatically selecting a labeled image element that is most similar to the selected unlabeled image element; and
    responsive to receiving user input, assigning a label of one of the automatically selected labeled image elements to the selected unlabeled image element.

8. A system, comprising:
    a memory; and
    one or more processors coupled to the memory, the memory storing program instructions executable by the one or more processors to implement an image labeling module configured to:
        receive a plurality of image elements extracted from a collection of images, the plurality of image elements including an unlabeled image element and two or more labeled image elements;
        automatically select a subset of the two or more labeled image elements for display;

display, in a different region of a display area, each of the selected labeled image elements, each displayed labeled image element including a different label;

determine a similarity between the unlabeled image element and each of the displayed labeled image elements;

display, in the display area, the unlabeled image element at a distance relative to one of the displayed labeled image elements based, at least in part, on the determined similarity; and receive a request to assign a label of one of the displayed labeled image elements to the unlabeled image element.

9. The system of claim 8, wherein determining the similarity includes calculating a similarity metric between the unlabeled image element and at least one of the displayed two or more labeled image elements.

10. The system of claim 9, wherein the image labeling module is further configured to determine a display size for the unlabeled image element, the display size being dependent on the determined similarity between the unlabeled image element and at least one of the displayed two or more labeled image elements.

11. The system of claim 8, wherein the image labeling module is further configured to:
assign, dependent on the received request, the label to the unlabeled image element;
recalculate, dependent on the assigned label, similarity between an additional unlabeled image element and the displayed two or more labeled image elements; and
display, in the display area, the additional unlabeled image element based on the recalculated similarity.

12. The method of claim 1, the assigning comprising:
associating the selected unlabeled image element with the automatically selected labeled image element; and
causing the label associated with the automatically selected labeled image element to be assigned to the selected unlabeled image element.

13. The method of claim 1, wherein the label assigned to the selected unlabeled image element is independent from a label of an image that includes the selected unlabeled image element.

14. The method of claim 1, wherein the determined similarity between the respective unlabeled image element and the respective labeled image element indicates a probability that a subject of the respective unlabeled image element is similar to a subject of the respective labeled image element.

15. The computer-readable storage device of claim 7, further comprising including the label assigned to the unlabeled image element as metadata for an image corresponding to the unlabeled image element.

16. The computer-readable storage device of claim 7, wherein two or more unlabeled image elements are included in a single image.

17. The computer-readable storage device of claim 7, wherein the label assigned to the selected unlabeled image element includes coordinate information specifying a location of the selected unlabeled image element in an image associated with the selected unlabeled image element.

18. The computer-readable storage device of claim 7, the operations further comprising displaying, in the display area, a source image that includes the selected unlabeled image element.

19. The computer-readable storage device of claim 7, further comprising receiving an entry to assign a new label via a text entry box associated with the selected unlabeled image element.

20. The computer-readable storage device of claim 7, wherein the selection of the at least one displayed unlabeled image elements comprises selecting at least two displayed unlabeled image elements.

* * * * *